US011231387B2

(12) United States Patent
Ross et al.

(10) Patent No.: US 11,231,387 B2
(45) Date of Patent: Jan. 25, 2022

(54) STABILIZATION OF SENSOR SIGNAL IN ELECTROCHEMICAL GAS SENSORS

(71) Applicant: MSA Europe GmbH, Rapperswill-Jona (CH)

(72) Inventors: Sebastian Ross, Berlin (DE); Kathrin Tölle, Berlin (DE); Brian Keith Davis, Butler, PA (US)

(73) Assignee: MSA Europe GmbH, Rapperswill-Jona (CH)

( * ) Notice: Subject to any disclaimer, the term of this patent is extended or adjusted under 35 U.S.C. 154(b) by 78 days.

(21) Appl. No.: 15/879,138

(22) Filed: Jan. 24, 2018

(65) Prior Publication Data

US 2019/0227025 A1 Jul. 25, 2019

(51) Int. Cl.

| | |
|---|---|
| ***G01N 27/406*** | (2006.01) |
| ***G01N 27/416*** | (2006.01) |
| ***G01N 27/407*** | (2006.01) |
| ***G01N 27/404*** | (2006.01) |

(52) U.S. Cl.

CPC ....... *G01N 27/4065* (2013.01); *G01N 27/407* (2013.01); *G01N 27/4045* (2013.01); *G01N 27/4163* (2013.01)

(58) Field of Classification Search

CPC ............. G01N 27/407; G01N 27/4163; G01N 27/4065

See application file for complete search history.

(56) References Cited

U.S. PATENT DOCUMENTS 4,481,804 A * 11/1984 Eberhard ........... A61B 5/14542 204/406
2008/0277290 A1 11/2008 Martin
(Continued)

FOREIGN PATENT DOCUMENTS

EP 1544614 A1 6/2005
EP 2975390 A1 1/2016
(Continued)

OTHER PUBLICATIONS

Cao, Z. and Stetter, J.R., "The Properties and Applications of Amperometric Gas Sensors," Electroanalysis, 4(3), 253 (1992).
(Continued)

*Primary Examiner* — Luan V Van
*Assistant Examiner* — Caitlyn Mingyun Sun
(74) *Attorney, Agent, or Firm* — Bartony & Associates LLC

(57) ABSTRACT

An electrochemical gas sensor includes a housing comprising a gas inlet, an electrolyte within the housing, a working electrode in ionic contact with the electrolyte, a counter electrode in ionic contact with the electrolyte and a secondary electrode in ionic contact with the electrolyte. Reaction of target gas at the secondary electrode is less than reaction of target gas at the working electrode. Electronic circuitry of the gas sensor is configured to measure an output from the working electrode and an output from the at least one secondary electrode. A correction factor is determined for correcting the output from the working electrode on the basis of the working electrode output and the secondary electrode output during an assessment in which the electrochemical sensor is exposed to the target gas for a determined period of time.

26 Claims, 11 Drawing Sheets

(56) References Cited

U.S. PATENT DOCUMENTS

| | | | | |
|---|---|---|---|---|
| 2016/0341691 | A1* | 11/2016 | Nakatou .............. | G01N 27/419 |
| 2017/0074844 | A1* | 3/2017 | Tolmie ................ | A61M 16/201 |

FOREIGN PATENT DOCUMENTS

| | | | |
|---|---|---|---|
| EP | 3223005 | A1 | 9/2017 |
| WO | WO2019147296 | A1 | 8/2019 |

OTHER PUBLICATIONS

Popoola Olalekan et al.; Development of a baseline-temperature correction methodology for electrochemical sensors and its implications for long term stability; Atmospheric Environment, Pergamon, GB, vol. 147, Oct. 14, 2016, pp. 330-343.

* cited by examiner 72 h of 10 ppm NH3 gassing with 25 ppm gassings before and after
WE signal and BE `baseline` signal for   -300 mV bias —— signal of WE1      --- signal of WE2 `baseline`

72 h of 10 ppm NH3 gassing with 25 ppm gas exposure before and after
Calculated ppm reading with correction factor F = -0.6 for -300 mV bias — · corrected signal (F=-0.6)

STABILIZATION OF SENSOR SIGNAL IN ELECTROCHEMICAL GAS SENSORS

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Electrochemical gas sensors or gas detectors typically include at least two electrodes, at least one of which is a gas diffusion electrode (working electrode) and the other one of which is a counter electrode. Both electrodes are in ionic contact via an appropriate electrolyte such as a solid electrolyte or liquid electrolyte. The use of ionic liquids as electrolytes became common in the past several years.

A problem associated with electrochemical gas sensors is that their response behavior changes over time. Changes in response behavior may, for example, result from changes in environmental conditions such as pressure, temperature, and humidity as well as long-term exposure to the analyte/target gas or one or more cross-interfering gases. A number of gas sensors, such as ammonia or $NH_3$ gas sensors, typically demonstrate a signal decline during long-term exposure to the target gas. In some cases it is possible to apply compensation algorithms to correct such unfavorable effects on the gas sensor. For example, a temperature compensation can be used for balancing the sensitivity of the target gas. However, in many cases of sensor instability, adequate compensating algorithms have yet to be developed.

SUMMARY

In one aspect, an electrochemical gas sensor for detecting a target gas includes a housing comprising at least one gas inlet, an electrolyte within the housing, at least one working electrode in ionic contact with the electrolyte, at least one counter electrode in ionic contact with the electrolyte and at least one secondary electrode in ionic contact with the electrolyte. The secondary electrode is configured so that reaction of the target gas entering the housing via the at least one gas inlet at the at least one secondary electrode is less than reaction of the target gas at the least one working electrode. The electrochemical gas sensor further includes electronic circuitry in operative connection with the at least one working electrode, the at least one counter electrode and the at least one secondary electrode. The electronic circuitry is configured to measure an output from the at least one working electrode, and to measure an output from the at least one secondary electrode. A correction factor is determined for correcting the output from the at least one working electrode on the basis of the output from the at least one working electrode and the output from the at least one secondary electrode. In determining the correction factor, the output from the at least one working electrode and the output from the at least one secondary electrode may be measured during an assessment in which the electrochemical sensor is exposed to the target gas for a determined period of time. During such an assessment, a test gas including a known concentration of the target gas may be applied to the electrochemical gas sensor for the determined period of time.

In a number of embodiments, the electrochemical gas sensor further includes at least one reference electrode in ionic contact with the electrolyte. In such embodiments, the electronic circuitry is also in operative connection with the at least one reference electrode.

The secondary sensor may, for example, be configured so that reaction of the target gas entering the housing via the at least one gas inlet at the at least one secondary electrode is less than reaction of the target gas at the least one working electrode via one or more physical barriers and/or electrochemical barriers. As used herein, the term "physical barriers" refer to components or element which limit transport (for example, diffusion) of the target gas to the secondary electrode. As used herein, the term "electrochemical barrier" refers to a condition that reduces or eliminates catalytic/electrocatalytic activity at the surface of the secondary electrode for molecules of target which reach the surface of the surface of the secondary electrode. Conditions that reduce or eliminate catalytic/electrocatalytic activity may, for example, be adjusted by choice of surface materials and/or potential biasing.

In a number of embodiments, the electrolyte may operate as a physical barrier. In that regard, the at least one working electrode may be positioned adjacent to the at least one gas inlet and the at least one secondary electrode may be arranged a predetermined distance from the at least one gas inlet that is greater than the distance of the at least one working electrode from the at least one gas inlet. In a number of embodiments, the at least one counter electrode and the at least one reference electrode are positioned within the housing in an interim space between the at least one working electrode and the at least one secondary electrode.

In a number of embodiments, the at least one secondary electrode is positioned within the housing such that at least one physical barrier through which the target gas cannot be transported is positioned between the at least one working electrode and the at least one secondary electrode. The at least one physical barrier may, for example, be a coating covering a portion of a surface of the at least one secondary electrode or a component spaced from the at least one secondary electrode.

In a number of embodiments, the at least one secondary electrode is-substantially catalytically inactive with the target gas during operation in at least one mode of the sensor. The at least one secondary electrode may, for example, be maintained at a potential via the electronic circuitry at which the at least one secondary electrode is substantially catalytically inactive with the target gas. The at least one secondary electrode may, for example, comprise an electrically conductive species which is substantially catalytically inactive with the target gas.

At least one of the working electrode, the counter electrode and the secondary electrode may, for example, include a metal selected from the group of Cu, Ni, Ti, Pt, Ir, Au, Pd, Ag, Ru, Rh, an oxide of Cu, Ni, Ti, Pt, Ir, Au, Pd, Ag, Ru, or Rh, mixtures thereof, or carbon, such as graphite, in particular graphite, Cu, Ag. The target gas may, for example, be selected from the group consisting of acid gases, basic gases, neutral gases, oxidizing gases, reducing gases, halogen gases, halogen vapours, and hydride gases. In a number of embodiments, the target gas is selected from the group consisting of $F_2$, $Cl_2$, $Br_2$, $I_2$, $O_2$, $O_3$, $ClO_2$, $NH_3$, $SO_2$, $H_2S$, CO, $CO_2$, NO, $NO_2$, $H_2$, HCl, HBr, HF, HCN, $PH_3$, $AsH_3$, $B_2H^6$, $GeH_4$ and $SiH_4$. In a number of embodiments, the target gas is $NH_3$, $Cl_2$ or $SO_2$. In a number of embodiments, the target gas is $SO_2$.

In a number of embodiments, the secondary electrode includes a conductive species on a surface thereof. The conductive species maintains ionic contact with the electrolyte. The secondary electrode may, for example, include a metal selected from the group of Cu, Ni, Ti, Pt, Ir, Au, Pd, Ag, Ru, Rh, an oxide of Cu, Ni, Ti, Pt, Ir, Au, Pd, Ag, Ru, or Rh, mixtures thereof, or carbon. In a number of embodiments, each of the working electrode and the secondary electrode include the same electrocatalytic species on a surface thereof.

In a number of embodiments, the electronic circuitry includes a processor system and a memory system in operative connection with the processor system. The correction factor may be stored in the memory system and be used by the processor system in correcting output of the working electrode. In a number of embodiments, the correction factor is determined on the basis of a ratio of a slope of an output curve of the working electrode to a slope of an output curve of the secondary electrode during exposure to the target gas. In a number of embodiments, an output signal from the working electrode (after the assessment, and during use of the electrochemical gas sensor to detect the target gas in an environment in fluid connection with the inlet of the electrochemical gas sensor) is corrected using the correction factor vie the formula $signal_{(corrected)}=signal_{WE}-(signal_{BE}*f)$ wherein $signal_{WE}$ is the output signal of the working electrode, $signal_{BE}$ is an output signal of the secondary electrode, and f is the correction factor.

In another aspect, method of stabilizing a gas concentration output signal of an electrochemical gas sensor for detecting a target gas is provided. The electrochemical gas sensor includes a housing having at least one gas inlet, an electrolyte within the housing, at least one working electrode in ionic contact with the electrolyte, at least one counter electrode in ionic contact with the electrolyte, at least one secondary electrode in ionic contact with the electrolyte. As described above, the secondary electrode is configured so that reaction of the target gas entering the housing via the at least one gas inlet at the at least one secondary electrode is less than reaction of the target gas at the least one working electrode. The electrochemical gas sensor further includes electronic circuitry in operative connection with the at least one working electrode, the at least one counter electrode and the at least one secondary electrode. The method includes measuring an output from the at least one working electrode via the electronic circuitry during an assessment in which the electrochemical sensor is exposed to the target gas for a determined period of time, measuring an output from the at least one secondary electrode via the electronic circuitry during the assessment, and determining a correction for the output from the at least one working electrode on the basis of the output from the at least one working electrode and the at least one secondary electrode during the assessment. During the assessment, a test gas including a known concentration of the target gas may be applied to the electrochemical gas sensor for the determined period of time.

As described above, the electrochemical gas sensor may further include at least one reference electrode in ionic contact with the electrolyte and in operative connection with the electronic circuitry. The electrochemical gas sensor may further be characterized as described above.

As also described above, the correction factor may be determined on the basis of a ratio of a slope an output curve of the working electrode to a slope of an output curve of the secondary electrode during exposure to the target gas during the assessment. In a number of embodiments, an output signal from the working electrode (after the assessment, and during use of the electrochemical gas sensor to detect the target gas in an environment in fluid connection with the inlet of the electrochemical gas sensor) is corrected using the correction factor vie the formula $signal_{(corrected)}=signal_{WE}-(signal_{BE}*f)$ wherein $signal_{WE}$ is the output signal of the working electrode, $signal_{BE}$ is an output signal of the secondary electrode, and f is the correction factor.

In a number of embodiments wherein the target gas is $NH_3$ a negative bias or a voltage in a range between −100 and −600 mV is applied to the secondary electrode, while no bias or voltage or a positive bias or voltage in a range between 10 and 100 mV is applied to the working electrode. In a number of embodiment, the negative bias or voltage applied to the secondary electrode is between −200 and −400 mV. In a number of embodiments, the positive bias or voltage applied to the working electrode is between 50 and 100 mV. The working electrode and the secondary electrode may, for example, include an iridium electrocatalyst.

The present devices, systems, and methods, along with the attributes and attendant advantages thereof, will best be appreciated and understood in view of the following detailed description taken in conjunction with the accompanying drawings.

DETAILED DESCRIPTION

Figure 1A:
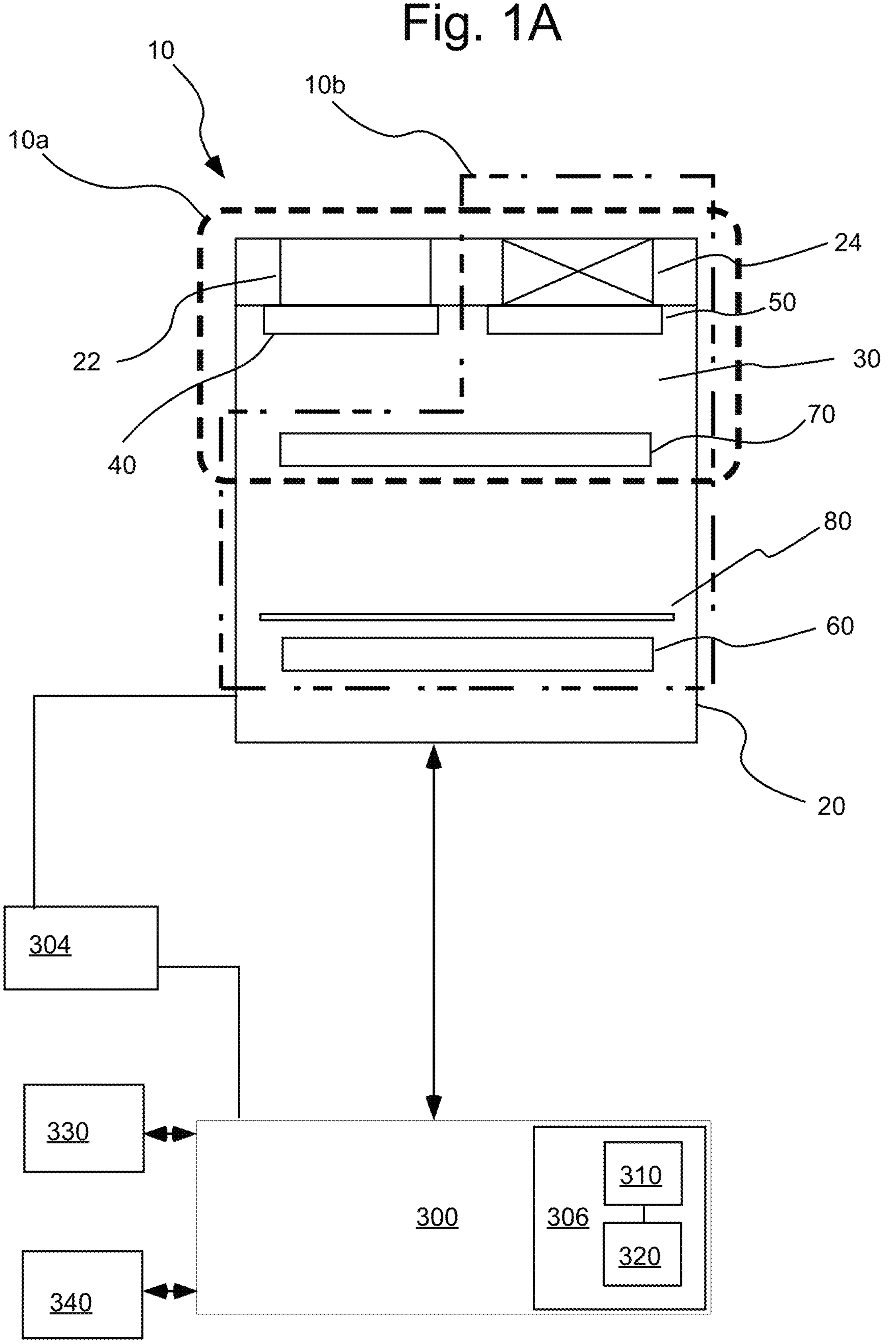
FIG. 1A illustrates an embodiment of an electrochemical gas sensor hereof.

It will be readily understood that the components of the embodiments, as generally described and illustrated in the figures herein, may be arranged and designed in a wide variety of different configurations in addition to the described representative embodiments. Thus, the following more detailed description of the representative embodiments, as illustrated in the figures, is not intended to limit the scope of the embodiments, as claimed, but is merely illustrative of representative embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "an electrode" includes a plurality of such electrodes and equivalents thereof known to those skilled in the art, and so forth, and reference to "the electrode" is a reference to one or more such electrodes and equivalents thereof known to those skilled in the art, and so forth. Recitation of ranges of values herein are merely intended to serve as a shorthand method of referring individually to each separate value falling within the range. Unless otherwise indicated herein, and each separate value, as well as intermediate ranges, are incorporated into the specification as if individually recited herein. All methods described herein can be performed in any suitable order unless otherwise indicated herein or otherwise clearly contraindicated by the text.

In a number of embodiments, devices, systems and methods hereof are used for determining the baseline in an electrochemical gas sensor and for correction of that output (target gas concentration) signal of the gas sensor. For example, determination/correction of the baseline may be effected in the case of long-term exposure to analyte gas or in the case of exposure to interfering gases (that is, gases other than the analyte case which may cause an electrochemical reaction at the working electrode). In a number of embodiments, electrochemical gas sensor hereof include a secondary or baseline electrode.

As used herein, the term "circuit" or "circuitry" includes. but is not limited to, hardware, firmware, software or combinations of each to perform a function(s) or an action(s). For example, based on a desired feature or need, a circuit may include a software controlled microprocessor, discrete logic such as an application specific integrated circuit (ASIC), or other programmed logic device. A circuit may also be fully embodied as software. Accordingly, an electrochemical gas sensor comprising at least one electrolyte is provided, that comprises at least four electrodes being in contact with the at least one electrolyte.

The term "control system" or "controller," as used herein includes, but is not limited to, any circuit or device that coordinates and controls the operation of, for example, one or more input or output devices. For example, a controller can include a device having one or more processors, microprocessors, or central processing units (CPUs) capable of being programmed to perform input or output functions.

The term "processor," as used herein includes, but is not limited to, one or more of virtually any number of processor systems or stand-alone processors, such as microprocessors, microcontrollers, central processing units (CPUs), and digital signal processors (DSPs), in any combination. A processor may be associated with various other circuits that support operation of the processor, such as a memory system (for example, random access memory (RAM), read-only memory (ROM), programmable read-only memory (PROM), erasable programmable read only memory (EPROM)), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

The term "software," as used herein includes, but is not limited to, one or more computer readable or executable instructions that cause a computer or other electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, or the desires of a designer/programmer or the like.

In an electrochemical gas sensor, the gas to be measured typically passes from the surrounding atmosphere or environment into a sensor housing through a gas porous or gas permeable membrane to a first electrode or working electrode (sometimes called a sensing electrode; sometimes also referred to herein as a primary working electrode) where a chemical reaction occurs. A complementary chemical reaction occurs at a second electrode known as a counter electrode (or an auxiliary electrode). The electrochemical sensor produces an analytical signal via the generation of a current arising directly from the oxidation or reduction of the analyte gas (that is, the gas to be detected) at the working electrode. A comprehensive discussion of electrochemical gas sensors is also provided in Cao, Z. and Stetter, J. R., “The Properties and Applications of Amperometric Gas Sensors,” *Electroanalysis,* 4(3), 253 (1992), the disclosure of which is incorporated herein by reference.

The working and counter electrode combination produces an electrical signal that is (1) related to the concentration of the analyte gas and (2) sufficiently strong to provide a signal-to-noise ratio suitable to distinguish between concentration levels of the analyte gas over the entire range of interest. In other words, the current flow between the working electrode and the counter electrode must be measurably proportional to the concentration of the analyte gas over the concentration range of interest.

In addition to a working electrode and a counter electrode, an electrochemical sensor often includes a third electrode, commonly referred to as a reference electrode. A reference electrode is used to maintain the working electrode at a known voltage or potential. The reference electrode should be physically and chemically stable in the electrolyte.

Electrical connection between the working electrode and the counter electrode is maintained through the electrolyte. Functions of the electrolyte include: (1) to efficiently carry the ionic current; (2) to solubilize the analyte gas; (3) to support both the counter and the working electrode reactions; and (4) to form a stable reference potential with the reference electrode. Criteria for an electrolyte may, for example, include the following: (1) electrochemical inertness; (2) ionic conductivity; (3) chemical inertness; (4) temperature stability; (5) low cost; (6) low toxicity; (7) low flammability; and (8) appropriate viscosity.

In general, the electrodes of an electrochemical cell provide a surface at which an oxidation or a reduction (a redox) reaction occurs to provide a mechanism whereby the ionic conduction of the electrolyte solution is coupled with the electron conduction of the electrode to provide a complete circuit for a current. The measurable current arising from the cell reactions of the electrochemical cell is directly proportional to the extent of reaction occurring at the electrode. Preferably, therefore, a high reaction rate is maintained in the electrochemical cell. For this reason, the counter electrode and/or the working electrode of the electrochemical cell generally include an appropriate electrocatalyst on the surface thereof to support the reaction rate.

It was hypothesized that signal instability or change arising from a number of conditions is a result of baseline change. Without limitation to any mechanism, it was hypothesized that such baseline changes may arise from (1) changes in the reference potential (which may, for example, arise from a variety of changes—for example, electrolyte changes in the vicinity of the working electrode which diffuse through the electrolyte, and which may vary between different target gases and between different electrolytes/electrolyte systems) and/or (2) from changes in the surface of the working electrode and/or the interface thereof with the electrolyte, for example, from deposition of one or more products or byproducts of the catalyzed reaction.

However, the electrochemical baseline is not readily available or determinable for the majority of gas sensors. For example, is it typically not possible to distinguish between or separate the effects of baseline changes arising from different mechanisms as described above. In a number of embodiments, hereof devices, system and methods for correction of a sensor output based upon a measurement of baseline change are set forth.

In a number of embodiments hereof, an electrochemical gas sensor or sensor system includes a working electrode, a counter electrode and a secondary or baseline electrode. The working electrode and/or the baseline electrode may, for example, be biased with respect to the counter electrode. In other embodiments, a reference electrode is included. In such embodiments, the working electrode and/or the baseline electrode may, for example, be biased with respect to the reference electrode. In a number of embodiments, electrochemical gas sensor hereof may be described as including at least two systems: a first, primary sensor system and a second, baseline system, wherein the primary sensor system and baseline sensor system share the counter electrode (and the reference electrode, in the case that a reference electrode is present). Each of the working electrode, the counter electrode and the secondary or baseline electrode (as well as the reference electrode, when present) is in ionic contact with the electrolyte of the electrochemical gas sensor. The introduction of a secondary or baseline electrode into an electrochemical gas sensor provides a channel/system to measure the response to the target gas (primary sensor system) and a second channel/system (baseline system) to assist in observing changes in the electrochemical baseline of the sensor.

The primary sensor system includes at least one working electrode or primary working electrode, and at least one counter electrode. As set forth above, the primary sensor system may also include at least one reference electrode. The primary sensor system detects/measures the at least one target gas (or analyte gas) via an output signal from the primary working electrode.

As described above, the secondary sensor system includes at least one secondary or baseline electrode. In a number of embodiments, the baseline electrode is closely matched in composition and fabrication to the primary working electrode and is sometimes referenced herein as a secondary working electrode. As also described above, the baseline sensor system further includes the at least one counter electrode. The baseline sensor system may also include the at least one reference electrode.

The systems hereof provide for measurement of changes in the baseline of an electrochemical sensor and allow for a correction of baseline changing events (for example, a baseline shift in a representative $NH_3$ sensors as a result of prolonged exposure to the target or analyte gas, and other gas(s) with which the working electrode interacts, as well as changes in humidity, etc.). The measurement of a sensor baseline provides a methodology for increasing the stability of electrochemical gas sensors and allows for improved long-term performance and extended sensor lifetime. Also, unexpected events during the sensor life may be detected. A root cause of such events may be identified and/or a correction may be performed. Likewise, sensor maintenance or replacement may be determined to be required. Thresholds for changes in values, rates of change is such values etc. may be analyzed (for example, via software resident on a device or system hereof) to determine if a calibration with a test gas (that is, a gas including a known concentration of the analyte gas or a simulant gas, which is a gas to which the sensor is also responsive) should be performed. A correction factor as described herein may be updated or recalculated as a result of such a calibration.

In a number of embodiments, the electrochemical gas sensors include a housing with at least one inlet for entrance of gas from the ambient environment, which may include a target or analyte gas. The sensor housing may, for example, be formed of a metal or any other suitable material. Polymer or other plastic materials are also examples of suitable materials for the housing. The electrodes may, for example, be arranged within the housing such that the at least one primary working electrode is adjacent to or in proximity to the at least one gas inlet.

In a number of embodiments, the effects of target gas entering the sensor housing on the surface of the secondary or baseline electrode are minimized or eliminated. In that regard, interaction/reaction of the target gas, reaction products or byproducts at the surface of the secondary or baseline electrode may be minimized or eliminated. In a number of embodiments, the reaction of the target gas (or an interferant gas) at the surface of the secondary or baseline electrode is reduced (and typically significantly reduced or eliminated) as compared to the reaction of the target gas (or an interferant gas) at the primary working electrode. This may, for example, be accomplished by minimizing the concentration of the target gas (or an interferant gas(es)) at the surface of the secondary or baseline electrode. For example, the at least one secondary or baseline electrode may be arranged within the gas sensor housing to be a pre-defined or predetermined distance from the gas inlet within the housing. This predetermined distance may be greater than (and typically significantly greater than) the distance of the primary working electrode from the inlet. Thus, the secondary or baseline electrode is arranged in the electrolyte or electrolyte volume a predetermined distance from the inlet as well as the primary working electrode.

The secondary or baseline electrode may, for example, be arranged in a section of the housing where the concentration of the target gas within the electrolyte is low (that is, where the concentration gradient of the target gas within the electrolyte is low, and preferably almost zero). In general, providing a long and/or tortuous diffusion path between the inlet and the secondary baseline electrode decreases the amount of target gas reaching the secondary baseline electrode. This arrangement may be applied in case of a protected/coated secondary or baseline electrode or in the case of an unprotected secondary or baseline electrode as further described below.

The predetermined distance between gas inlet and the baseline electrode may, for example, correspond to approximately the complete length of the housing. Thus, in a number of embodiments, the baseline electrode may be arranged in the lower or bottom section of the sensor housing (opposite to the gas inlet, which is positioned in an upper or top section of the housing). In other words, the baseline electrode may be positioned close to the bottom of the gas sensor housing, opposite to the gas inlet.

In a number of embodiments, the at least one counter electrode and the at least one reference electrode are arranged in the interim space between the primary working electrode and the secondary or baseline electrode. The interim space extends from the upper housing section to the lower housing section. The electrode arrangement may be such that the surface planes of counter electrode and the reference electrode are aligned parallel or generally parallel to the surface plane of the primary working electrode and to the surface plane of the secondary or baseline electrode. In such embodiments, the placement or "stacking" of the electrodes may thus be as follows: starting from the gas inlet, primary working electrode; counter electrode; reference electrode (when present); and secondary or baseline electrode.

In general, any sensor arrangement or electrode position is possible. In another representative embodiment, the counter electrode is not positioned in the space between the primary working electrode and the baseline electrode, but is placed adjacent to the primary working electrode (that is, in the upper housing section). In this case, the positioning or stacking of the electrodes is be similar to the stacking or positioning of electrodes in a conventional gas sensor with two gas inlets and two working electrodes to, for example, detect different gases. However, the counter electrode is positioned in the sensor hereof where one of the working electrodes is positioned in the conventional, two-gas-inlet/two-working-electrode sensor. In a number of studied gas sensors hereof, a housing similar to a conventional gas sensor with two gas inlets and two working electrodes was used wherein one such gas inlet (adjacent the counter electrode) was be sealed off or blocked to passage of gas from the environment. In such an embodiment, only the reference electrode (when present) may, for example, be arranged in the space between the primary working electrode and the secondary or baseline electrode.

In a number of embodiments, a barrier or protective barrier is used to reduce interaction/reaction of the target gas at the baseline electrode. The barrier may be a physical barrier or an electrochemical barrier. In the case of one or more physical barriers, the barrier may assist in minimizing or preventing contact of the target gas (that may diffuse through the electrolyte) with the secondary or baseline electrode in a physical manner by, for example, a spatial reaction discrimination. In the case that the baseline electrode is spaced from the inlet, the space/electrolyte between the inlet and the baseline electrode may be considered a physical barrier. One or more other physical barriers, which is/are impermeable to the target gas (or through which the target gas is not transportable) may be used to increase the length/tortuous nature of the diffusion path between the inlet and the secondary or baseline electrode.

In the case of an electrochemical barrier, interaction/reaction at the secondary or baseline electrode is reduced in an electrochemical manner or by electrochemical reaction discrimination. Such a discrimination approach allows for determination of the sensor baseline that may be used to correct sensor output and/or to help in identifying root causes of failures and failure modes in gas sensors.

In a number of embodiments, one or more physical barriers may be spaced from the secondary or baseline electrode. A physical barrier may also be a coating on the surface of the secondary or baseline electrode that is impermeable for the target gas. A physical barrier spaced from (and, for example, adjacent to the secondary or baseline electrode) or a surface coating on the secondary or baseline electrode may, for example, be formed from a polymeric materials such as polyethylene (PE), polytetrafluorethylene (PTFE) or derivatives thereof such as NAFION® (a sulfonized PTFE available from The Chemours Company of Wilmington, Del.). Also ceramic materials or glass may be used as coating materials.

The physical barriers hereof allow ionic contact of the secondary or baseline electrode with the electrolyte. As described above, the barrier may be a membrane arranged adjacent to and spaced from the baseline electrode, and between the baseline electrode and the inlet. In the case of a surface coating on the secondary or baseline electrode, a portion of the electrode (for example, the edge thereof or a portion thereof on the surface opposite the inlet), as described above, remains in contact with the electrode. Barriers in the form of a surface coating may be combined with one or more barriers or separators spaced from the baseline electrode.

As described above, the barrier to interaction/reaction of the target analyte at the secondary or baseline electrode may also be an electrochemical barrier. In the case that the baseline electrode includes an electrocatalyst to catalyze oxidation/reduction of the target gas (for example, the same electrocatalyst as the primary working electrode), an electrochemical barrier may be provided by applying a bias or bias voltage to at least one the primary working electrode, the baseline electrode, or to both the primary working electrode and the baseline electrode. The electrochemical barrier inhibits (that is, reduces, minimizes or prevents) the reaction of at least one target gas on the secondary or baseline electrode. In general, applying or not applying a bias to the secondary or baseline electrode, such that the bias voltage of the baseline electrode is different from that of the primary working electrode, can reduce or prevent oxidation or reduction of the target gas (depending on the gas and the applied bias) at the secondary or baseline electrode, while oxidation or reduction of the target gas occurs at the primary working electrode. An electrochemical barrier may alternatively be provided by including a conductive material on the baseline electrode other than the electrocatalyst of the working electrode. That material may be substantially catalytically inactive or completely catalytically inactive to catalyze oxidation/reduction of the target gas at the operating potential of the baseline electrode, which may be the same as the operating potential of the working electrode or different.

As used herein, the phrase "substantially inactive" refers to an electrode material or an electrode such as the secondary or baseline electrode hereof that is significantly less catalytically active than the working electrode under the conditions of operation in at least one operational mode of the present sensors. In general, a material of a baseline electrode hereof may be less than 5%, or less than 1% (for example, measured in katals) as catalytically active for the target gas under the operating conditions. As it is desirable to minimize the reaction of the target gas at a baseline electrode hereof, in many embodiments, the material of the baseline electrode is completely inactive under the conditions of operation as a baseline electrode. In the case of a material than is catalytically active to catalyze reaction of the target gas at a certain range of potentials (for example, when a baseline electrode hereof includes the same electrocatalyst as the primary or working electrode), the phrase "substantially inactive" when used in connection with an electrode for a particular reaction and/or potential as used herein refers to a potential which is more positive than the appearance potential for a reduction reaction and more negative than an appearance potential for an oxidation reaction. The concept of an appearance potential is further described below.

In that regard, electrochemical techniques provide a method of "tuning" or adjusting the catalytic power or energy of a catalytic surface (the electrode surface). Most modern electrochemical techniques assume the presence of a reference electrode. As described above, a reference electrode is an electrode having a thermodynamic potential fixed by it structure, against which the potential of the working electrode is measured or controlled. By driving the potential of the working electrode negatively (cathodically) with respect to a reference electrode, a potential will be reached where species in solution will undergo reduction (that is, an algebraic decrease in the oxidation number). Prior to reaching a certain, critical cathodic potential, no reduction occurs, essentially no current flows through the cell, and the electrode may be said to be "substantially inactive" with regard to the reduction of the dissolved species.

Conversely, the working electrode can be driven positively, with respect to the reference electrode, until a potential is reached where a dissolved species can undergo oxidation (that is, an algebraic increase in the oxidation number). Once again, until a certain, critical anodic potential is reached, the dissolved species does not undergo oxidation, and the working electrode can be said to be "substantially inactive" with regard to the oxidation of the dissolved species.

Figure 1B:
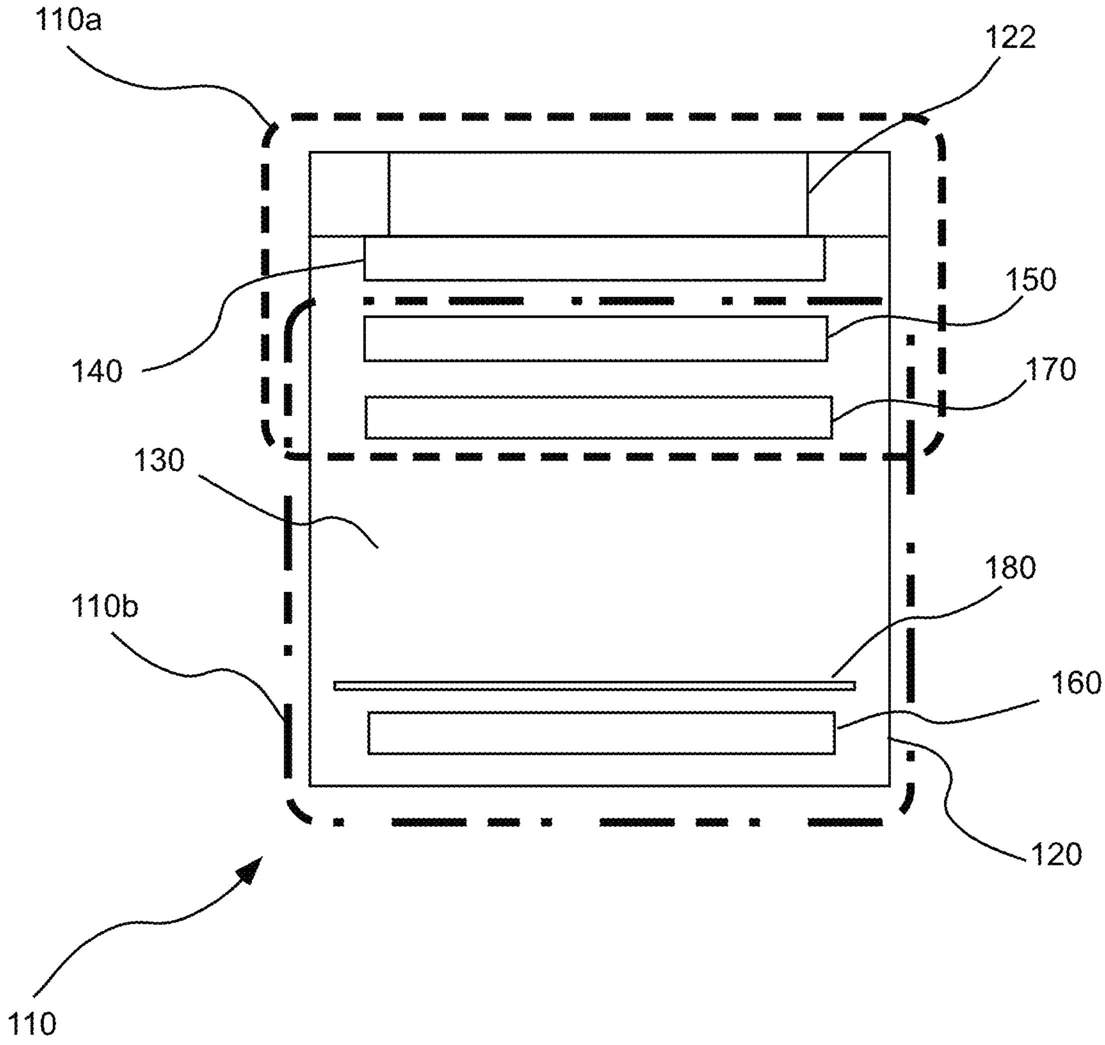
FIG. 1B illustrates another embodiment of an electrochemical gas sensor hereof.
Figure 1C:
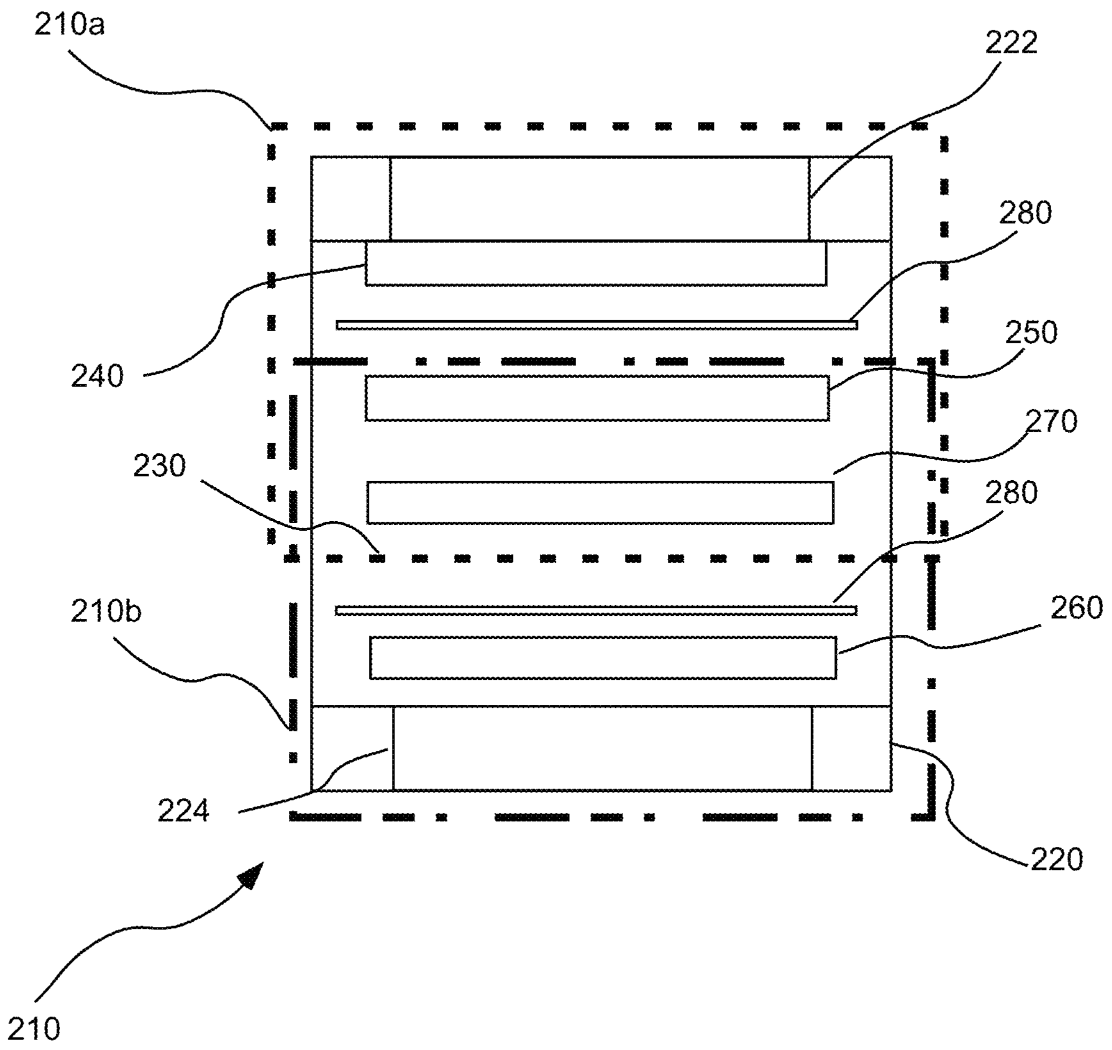
FIG. 1C illustrates another embodiment of an electrochemical gas sensor hereof.
Figure 1D:
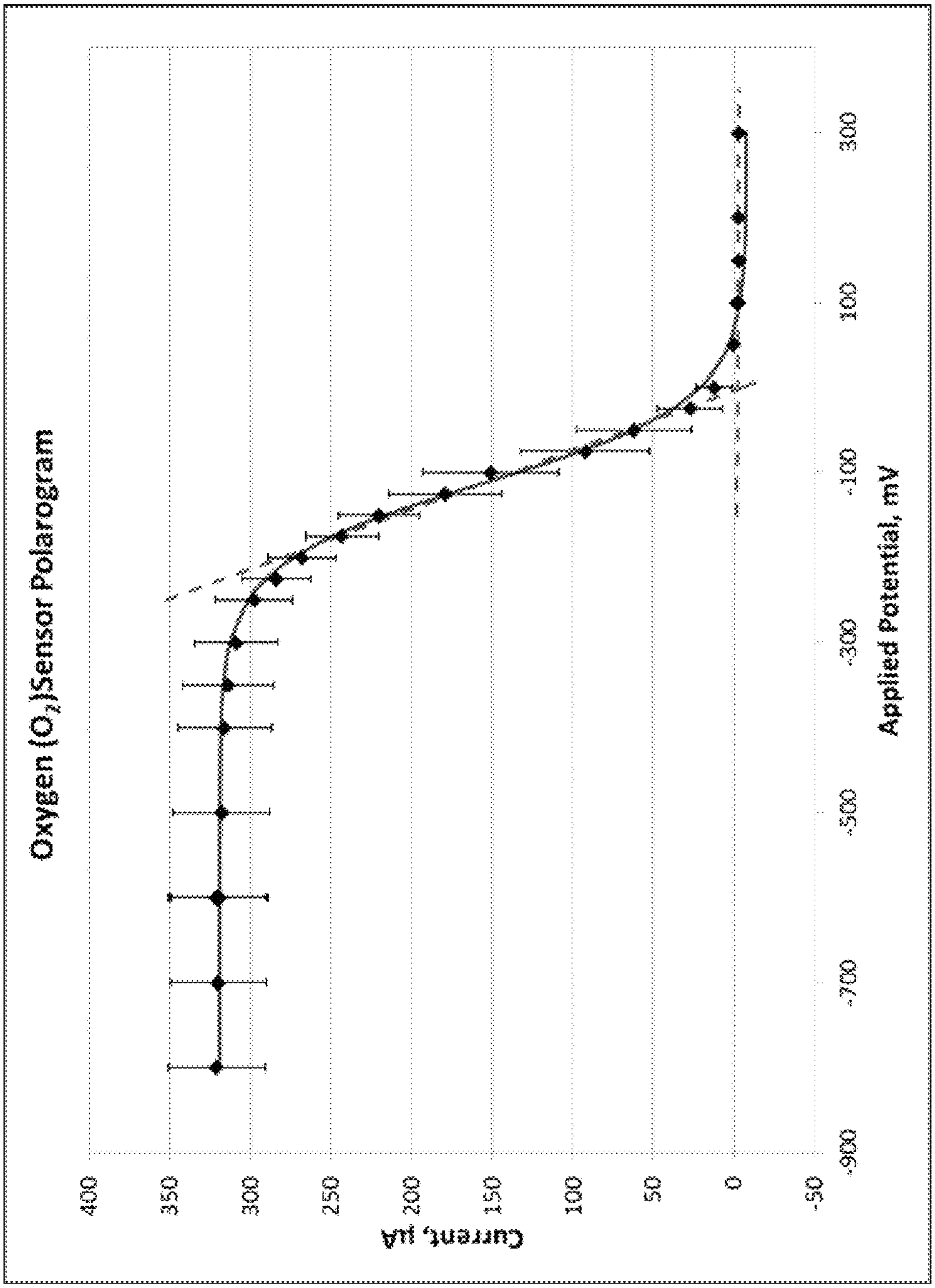
FIG. 1D illustrates a representative polarogram (a plot of current vs. applied potential) for the reduction of oxygen in acidic aqueous solution and the determination of an appearance potential.

For example, FIG. 1D illustrates a representative polarogram (a plot of current vs. applied potential) for the reduction of oxygen in acidic aqueous solution. At potentials more negative than about −400 mV, the reduction of oxygen proceeds readily. The typical operating bias of oxygen sensors is between −400 and −800 mV. This is at the top of the polarographic "wave," and the current at these potentials is said to be "diffusion limited" (that is, limited by the rate of diffusion of oxygen to the working electrode of the sensor). At potentials more positive than about +50 mV, no current flows (because there is no reduction of oxygen as such potentials). Electrochemists use the term "appearance potential" to designate the approximate potential at which the polarographic wave begins. It is commonly found by determining the intersection of the two straight dashed lines in the figure. These lines were the result of linear regression analysis of the data between about 0 and −400 mV (the "wave" or rising portion of the curve) and between about 0 and +350 mV (the "baseline" portion of the curve). In the case of the data shown in FIG. 1D, the appearance potential is about −2 mV. Therefore, the working electrode can be said to be substantially inactive for the reduction of oxygen at any potential more positive than about −2 mV, and becoming even more inactive at more positive potentials.

The previous discussion was presented in connection with a reduction reaction, and more particularly, the reduction of oxygen. However, a similar discussion applies in the case of oxidation reactions and the working electrode can be said to be substantially inactive for a given oxidation reaction at potentials more negative than the appearance potential for that oxidation reaction.

Without limitation to any mechanism, whether physical and/or electrochemical barriers are used in the sensors hereof, minimizing or eliminating interaction/reaction of the target gas at the surface of the secondary or baseline electrode minimizes or eliminates alteration or poisoning of the surface of the secondary or baseline electrode and alteration in the electrode/electrolyte interface which occur at the working electrode. However, the secondary or baseline electrode remains in ionic connection with the electrolyte and experiences baseline changes which may arise from changes in reference potential. As described further below, comparison of change in output from the working electrode and change in output of the secondary or baseline electrode over time upon exposure to the target gas provides an indication of baseline change and provides an opportunity to correct output of the working electrode (that is, to correct the measurement of target gas concentration).

In a number of embodiments hereof, one or both of the primary working electrode and secondary or baseline electrode is connected to electronic circuitry including one or more voltage transmitters for applying the bias thereto. The bias or voltage is applied to the electrode by connecting the electrode to the voltage transmitter.

The principles of operation of an electrochemical barrier are further described below. In case the target gas is oxidized on a working electrode such as the primary working electrode hereof, the oxidation is supported by applying a positive bias or voltage (above 0 mV). In turn, if a negative bias or voltage (below 0 mV) is applied, the oxidation of the target gas is inhibited, and any reaction of the target at the electrode surface is reduced or even prevented.

In case the target gas is reduced on a working electrode, the reduction is supported by applying a negative bias or voltage to the working electrode. A reduction reaction is thus inhibited by applying a positive bias or voltage to the electrode.

For example, in case of ammonia ($NH_3$) gas sensor, the target gas $NH_3$ is oxidized on the primary working electrode according to the following formula:

$$2NH_3 \rightarrow N_2+6H^++6e^-$$

In the course of $NH_3$ oxidation, electrons are emitted or transferred to the working electrode, thereby generating an electron flow and a signal. The oxidation on the primary working electrode may be supported by applying a positive bias or voltage (i.e. ≥0 mV) to the primary working electrode.

On the other hand, when applying a negative bias or voltage to an electrode, the oxidation of a target gas such as ammonia (which is oxidized) should be inhibited as described above. Thus, any reaction of the target gas with the electrode is reduced or prevented. Thus, in the case of a target gas, such as ammonia, which is oxidized, a negative bias may be applied to the secondary or baseline electrode to inhibit oxidation of target gas (that is, the target gas cannot emit electrons to the secondary or baseline electrode). Therefore, reaction of the target gas at the surface of the secondary or baseline electrode is reduced or even prevented.

In the representative example of a $NH_3$ gas sensor in which the baseline electrode includes the same electrocatalyst as the working electrode (for example, Iridium or Ir), a negative bias or voltage in a range of approximately −100 to −600 mV, or in the range of approximately −200 to −400 mV, may applied to the secondary or baseline electrode, while no bias (voltage) or a positive bias (voltage) in the range of approximately 10 to 100 mV, or in the range of approximately 50 to 100 mV, may be applied to the primary working electrode.

The secondary or baseline electrode provides a measure for the electrochemical sensor baseline without interfering with the target gas. In a number of embodiments, a mathematical combination of the signal from the primary working electrode and the signal from secondary or baseline electrode (as described in more detail below) may provide a corrected sensor signal. Using the corrected signal, the electrochemical gas sensors hereof output a stable gas sensor signal, even in case of long-term exposure to the target gas and/or other signal disturbing conditions. In a number of embodiments, a first signal (for example, a current signal $i_{WE}$) of the at least one primary working electrode (WE) is measured in response to the at least one target gas. A second signal of the secondary or baseline electrode (BE) (for example, a current signal $i_{BE}$) is measured. In a number of embodiments, a correction factor F is applied according to the equation:

$$F \approx \Delta i_{WE}/\Delta i_{BE}$$

The signal (that is, current signal $i_{WE}$) of the primary working electrode (WE) is adjusted or corrected by applying the correction factor F. A corrected signal may be calculated using the following equation:

$$i_{corrected}=i_{WE}-(i_{BE}*F)$$

In a number of embodiments of an $NH_3$ sensor, the calculated correction factor F may, for example, be in the range of approximately −10 to +10, or in the range of approximately −6 to +6, or in the range of approximately −3 and +3. The correction factor F may also be in the range of approximately 0.3 to 2.0, or in the range of approximately 0.5 to 1.5. The correction factor F depends the sensor setup and composition, including barrier system/methodology applied to the secondary or baseline electrode.

When applying above parameters and conditions, representative $NH_3$ sensors hereof provide a stable signal for $NH_3$ gas exposure of at least 20 min, at least 60 min, or at least 120 min. The signal may be even be stable for at least one day or longer. In a number of embodiments, a stable signal may be measured over a time period of at least 24 hours, at least 48 hours, or at least 72 hours even when exposed to relatively high concentration of $NH_3$. As used herein, a "stable" signal is a signal that does not change by +/−10%, or even +/−5% over a certain period of time. In a number of embodiments, the signal does not change +/−10%, or even +/−5% over a period of two weeks under exposure of analyte at a predetermined concentration (for example, 9 ppm $NH_3$) for two weeks. What may be considered a stable signal, however, may depend upon the concentration of the gas to which the sensor is exposed and the length/time of exposure. For example, an ammonia which has experienced 2000 ppm·hours of ammonia and outputs a signal that does not change +/−50% over a period of time may be considered stable. In general, however, the devices, systems and methods hereof increase signal stability for a wide variety of gas sensors over a broad range of gas exposure as compared to devices, systems and methods in which a baseline electrode as described herein is not used.

The length of time of signal stability depends on the target gas concentration. In a number of studies of $NH_3$ electrochemical gas sensors hereof, the gas concentration of the target gas was at least as 5 ppm, at least 25 ppm, or at least 50 ppm.

As described above, an electrochemical barrier may be combined with one or physical barriers. For example, the electrochemical barrier principle of applying a negative or positive bias or bias voltage to the secondary or baseline electrode may be combined with a separator membrane that is disposed adjacent to the secondary or baseline electrode. Likewise, the secondary or baseline electrode may be place distant from the inlet, wherein the length diffusion path through the electrolyte acts as a physical barrier.

In a number of embodiments, the surface of the secondary or baseline electrode (as well as the primary working electrode) may be "cleaned" by applying a pulse of energy thereto to drive off foreign matter/reaction products from the surface. Likewise, a sweep of energy through a range of potentials may be applied to the baseline electrode. A pulse and/or sweep of energy may be applied to the baseline electrode in a periodic manner. The frequency of such applications may be readily determined for a particular sensor type. Such a cleaning process may be particularly beneficial in the case of a secondary or baseline electrode that includes an electrocatalyst which catalyzes reaction of the target gas. Even in the case of use of an electrochemical barrier as described above, some reaction or interaction at the surface of the secondary or baseline electrode may occur.

The electrodes of the present gas sensor may, for example, comprise independently, the same or different, an electrocatalyst such as a metal selected from the group of Cu, Ni, Ti, Pt, Ir, Au, Pd, Ag, Ru, Rh, an oxide of Cu, Ni, Ti, Pt, Ir, Au, Pd, Ag, Ru, or Rh, mixtures thereof, or carbon, such as graphite. In a number of embodiments of sensors hereof, the electrodes include Ir.

The target gas of the present gas sensor may, for example, be selected from the group of acid gases, basic gases, neutral gases, oxidizing gases, reducing gases, halogen gases, halogen vapours, and hydride gases. Examples of target gases include, but are not limited to, $F_2$, $Cl_2$, $Br_2$, $I_2$, $O_2$, $O_3$, $ClO_2$, $NH_3$, $SO_2$, $H_2S$, CO, $CO_2$, NO, $NO_2$, $H_2$, HCl, HBr, HF, HCN, $PH_3$, $AsH_3$, $B_2H^6$, $GeH_4$ and $SiH_4$. The electrochemical gas sensors hereof are particularly suited for use with target gases wherein long-term exposure of the sensor to target gas and/or other conditions cause significant baseline drift.

As described above, an electrolyte is in ionic contact with the electrodes of the electrochemical gas sensors hereof. In a number of embodiments, the electrolyte may, for example, comprise at least one ionic liquid. The ionic liquid may, for example, include at least one additive portion. In other embodiments, the electrolyte may, for example, include at least one of an aqueous salt solution (for example, an aqueous LiCl solution), a mineral acid (for example, $H_2SO_4$ or $H_3PO_4$), a base (for example, KOH), an organic salt solution (for example, $LiPF_6$ in dimethylcarbonate/ethylencarbonate, glycol).

In case that the electrolyte includes an ionic liquid, the ionic liquid may, for example, include at least one cation. The cation may, for example, be selected from the group of imidazolium, pyridinium, or guanidinium. The cation may, for example, be unsubstituted or substituted with at least one of an aryl group or a C1 to C4 alkyl group. The aryl group and the C1 to C4 alkyl group may be unsubstituted or substituted with at least one of a halogen, a C1 to C4 alkyl group, a hydroxyl group or an amino group. In several embodiments, the ionic liquid includes at least one of an imidazolium cation, a C1 to C4 alkyl imidazolium cation, a pyridinium cation or a C1 to C4 alkyl pyridinium cation.

The ionic liquid may, for example, include at least one anion selected from the group of the a halide anion (that is, chloride, iodide, bromide or fluoride), a nitrate anion, a nitrite anion, a tetrafluoroborate anion, a hexafluorophosphate anion, a polyfluoroalkane sulphonate anion, a bis(trifluoromethylsulfonyl)imide anion, an alkyl sulphate anion, an alkane sulphonate anion, an acetate anion and an anion of a fluoroalkane acid.

In a number of embodiments, the ionic liquid includes at least one anion selected from the group of a C1-C6 alkyl sulphate anion and a C1-C6 alkane sulphonate anion. The ionic liquid can, for example, include at least one anion from the group of a methyl sulphate anion, an ethyl sulphate anion, a butyl sulphate anion, a methanesulphonate anion, an ethanesulphonate anion and a butanesulphonate anion. In a number of embodiments the ionic liquid comprises 1-ethyl-3-methylimidazolium methanesulphonate or ethylammonium nitrate.

As described above, the ionic liquid electrolyte may include an additive portion. The additive portion may, for example, include at least one organic additive, an organometallic additive or an inorganic additive. In general, the organic additive, the organometallic additive and/or the inorganic additive are not ionic liquids. The performance of gas sensors may, for example, be improved significantly with regard to sensitivity, response time, selectivity and robustness by adding such additives to the ionic liquid in forming an electrolyte.

The additive portion or the additives may, for example, be included within the ionic liquid in an amount of 0.05 to 15 weight %. Organic additives may for example be included in an amount of 0.05 to 5.0 weight %. Inorganic additives can be included in an amount of 0.05 to 5.0 weight %. Organometallic additives can be included in an amount of 0.05 to 5 weight-%.

Mixtures of various additives can also be used in the electrolyte. The additive mixture can be a mixture of various additives of the same group (for example a mixture of various organic additives). The mixture of different additives can also include additives from different groups (for example mixture of organic and inorganic additives). The cross sensitivity behavior of sensors can be adapted to specific requirements by using mixtures of various additives.

The at least one organic additive can be selected from the group comprising imidazole, a C1 to C4 alkyl imidazole, pyridine, a C1 to C4 alkyl pyridine, pyrrole, a C1 to C4 alkyl pyrrole, pyrazole, a C1 to C4 alkyl pyrazole, pyrimidine, a C1 to C4 alkyl pyrimidine, guanine, a C1 to C4 alkyl guanine, uric acid, benzoic acid, a porphyrin, or a porphyrin derivative.

The at least one organometallic additive may, for example, be selected from the group of organometallic porphyrins and organometallic porphyrin derivatives. Organometallic porphyrins may, for example, be selected from the group of porphyrins with at least one meso-alkyl substituent, at least one (3-alkyl substituent, at least one aryl substituent, and their derivatives. Organometallic porphyrin derivatives may, for example, be selected from the group of a metal phthalocyanine with $Mn^{2+}$, $Cu^{2+}$, $Fe^{2+/3+}$ or $Pb^{2+}$ as the metal cation.

Inorganic additives may, for example, be selected from the group of an alkali halide, an ammonium halide, a C1 to C4 alkyl ammonium halide, a transition metal salt and a lead salt. The transition metal salt may, for example, be selected from the group of salts of $Mn^{2+}$, $Mn^{3+}$, $Cu^{2+}$ $Ag^{+}$, $Cr^{3+}$, $Ci^{6+}$, $Fe^{2+}$, or $Fe^{3+}$. The lead salt may, for example, be a salt of $Pb^{2+}$. In several embodiments, an inorganic additive is selected from the group of lithium bromide, lithium iodide, ammonium iodide, tetramethylammonium iodide, tetraethylammonium iodide, tetrapropylammonium iodide, tetrabutylammonium iodide, tetrabutylammonium bromide, manganese(II) chloride, manganese(II) sulphate, manganese (II) nitrate, chrom(III) chloride, alkali chromates, iron(II) chloride, iron(III) chloride and lead(II) nitrate.

Electrolytes hereof may, for example, be substantially absorbed in a solid material. At least a part of the additive portion may be immobilized upon a solid support, upon the solid material and/or upon at least one of the electrodes. In several embodiments, the solid material may, for example, be a powdered silicate having an average particle size of at least 5 μm, at least 50 μm or at least 75 μm, having a specific surface area of at least 50 $m^2/g$, at least 100 $m^2/g$ or at least 150 $m^2/g$ and a $SiO_2$ content of at least 95% by weight. In other embodiments, the liquid electrolyte may, for example, be absorbed upon a fibrous nonwoven solid material in the form of the glass fibre.

A number of embodiments of the electrochemical gas sensors and methods hereof are discussed further in the following representative examples with reference to the figures.

FIG. 1A illustrates an embodiment of a gas sensor (10) hereof including a sensor housing (20) and an electrolyte (30) arranged in sensor housing (20). A gas inlet or opening (22) is provided that allows the entry of the target gas into sensor housing (20). Adjacent to gas inlet or opening (22), a first or primary working electrode (40) for detecting a target gas is disposed within sensor housing (20) such that the target gas entering sensor housing (20) strikes first working electrode (40) and generates a current.

In a number of embodiments studied, sensor housing (20) was a housing used for a two-working-electrode sensor for detecting two different gases. In that regard, there was also a second gas inlet (24) as found, for example, in conventional gas sensors used for detecting two different gases. Second gas inlet (24) is, however, sealed off or blocked in the studies hereof such that no target gas can enter sensor housing (20).

Counter electrode (50) is used in connection with primary working electrode (40) and in connection a secondary or baseline electrode (60). In a number of embodiments, secondary or baseline electrode (60) is matched closely in fabrication and composition to primary working electrode (40) and may be referred to as secondary working electrode (60). Secondary or baseline electrode (60) may, for example, include the same electrocatalyst as primary working electrode (40), but serves (at least in one mode of operation) as a baseline electrode as described above. Second or baseline electrode (60), may also include a different electrocatalyst than the electrocatalyst of primary working electrode (40) (for example, an electrocatalyst that does not interact with the target gas). Baseline electrode (60) does not require a catalytic material (that is, catalytic with respect to the analyte or target gas). Baseline electrode (60) (and other secondary or baseline electrodes hereof) may, for example, include an electrically conductive material that is inert to the analyte of target gas but suitable to maintain ionic contact with the electrolyte such that changes in reference potential are experienced by baseline electrode (60). The baseline behavior of baseline electrode (60) need only be correlatable with the baseline behavior of working electrode (60) so that a correction can be made as described above.

In the illustrated embodiment of sensor (10), a reference electrode (70) may, for example, be disposed in the electrolyte volume between secondary or baseline electrode (60) and primary working electrode (40). Reference electrode (70) is used for both first or primary working electrode (40) and secondary or baseline electrode (60).

In the illustrated embodiment, a membrane (80) is provided as physical barrier for minimizing the contact of secondary or baseline electrode (60) with the target gas entering sensor housing (20) via the gas inlet (22). In the embodiment of FIG. 1A, membrane (80) is positioned between reference electrode (70) and secondary or baseline electrode (60). In a number of embodiments, barrier membrane (80) was a polyethylene or PE membrane.

Primary working electrode (40), counter electrode (50) and reference electrode (70) form a primary sensor system (10*a*) that allows for detection or sensing of the target gas such as $NH_3$. Secondary or baseline electrode (60), counter electrode (50) and reference electrode (70) form a baseline sensor system (10*b*) that allows for determining a baseline of gas sensor 10.

As illustrated in FIG. 1A, electronic circuitry 300 may be placed in electrical connection with electrodes (40, 50, 60, 70) of gas sensor (10) and other gas sensor hereof. In the case of a gas sensor fixed at a position within a facility, power may be provided from a remote source. In the case of a portable or wireless sensor, power source (304) may include one or more batteries. Electronic circuitry of gas sensor (10) may, for example, include a control system (306) which may, for example, include control circuitry and/or a processor system (310) (including one or more processors such as, for example, a microprocessor) and an associated memory system (320) in communicative connection with processor(s) (310). A user interface may, for example, include a data output system 330 (including, for example, a display, an audio output, a tactile output etc.) in operative/communicative connection with control system (306) and a data input system (340) (including, for example, a touchscreen, a keyboard, etc.) in operative/communicative connection with control system (306). One or more control algorithms for operation of gas sensor (10) may, for example, be stored as software in memory system (320) and be executed by processor system (310). Electronic circuitry (300) may, for example, be configured to measure an output from primary working electrode (40), measure an output from the secondary or baseline electrode (60), and determine a correction for the output from primary working electrode (40) on the basis of the output from primary working electrode (40) and secondary or baseline electrode (60). Electronic circuitry (300) may also, for example, be configured to maintain a predetermined bias on one or more electrodes of the gas sensor hereof.

FIG. 1B illustrates another embodiment of a gas sensor 110 which includes a housing (120) and an electrolyte (130) within the interior volume of housing (120). Housing (120) of gas sensor (110) includes only one gas inlet opening (122) that allows the entry of the target gas into sensor housing (120). Adjacent to the gas inlet (122), a first or primary working electrode (140) is positioned within the sensor housing (120) such that target gas entering sensor housing (120) contacts first or primary working electrode WE1 (140) and generates a current.

A counter electrode (150) is oriented parallel or generally parallel to first or primary working electrode (140). In the orientation of FIG. 1B, counter electrode CE (150) is positioned below first or primary working electrode (140) within the electrolyte volume, wherein gas inlet 122 is positioned in a top or upper section of gas sensor (110). A reference electrode (170) is positioned parallel to or generally parallel to first or primary working electrode (140) below counter electrode (150) with the electrolyte volume.

A secondary or baseline electrode (160) is positioned parallel to or generally parallel to first or primary working electrode (140) and adjacent a bottom section of sensor housing (120), where the concentration of the target gas within the electrolyte is low or almost zero. A membrane (180), for example, a polyethylene membrane, is positioned in the electrolyte volume between reference electrode (170) and secondary or baseline electrode (160). Membrane (180) operates as physical barrier for minimizing the contact of secondary or baseline electrode (160) with target gas that has entered sensor housing (120) through gas inlet (122).

Primary working electrode (140), counter electrode (150) and reference electrode (170) form a primary sensor system (110*a*) that enables detection or sensing of the target gas such as $NH_3$. Secondary or baseline electrode (160), counter electrode (150) and reference electrode (170) form baseline sensor system (110*b*) that assists in determining a baseline and/or baseline drift of the gas sensor.

In addition, a bias may be applied to the primary working electrode and or the secondary or baseline electrode in any embodiment hereof. For example, in the case of a $NH_3$ sensor as described above, a negative bias may be applied to secondary or baseline electrode (160), and no bias or a positive bias may be applied to the primary working electrode (140).

FIG. 1C illustrates another embodiment of a gas sensor 210 hereof which includes a housing (220) and an electrolyte (230) within the interior volume of housing (220). Housing (220) of gas sensor (210) includes a first gas inlet opening (222) and a second gas inlet opening (224), each of which may allow the entry of the target gas into sensor housing (220). Adjacent to the gas inlet (222), a first or primary working electrode (240) is positioned within the sensor housing (220) such that target gas entering sensor housing (220) contacts first or primary working electrode (240).

A counter electrode (250) is oriented parallel or generally parallel to first or primary working electrode (240). In the orientation of FIG. 1C, counter electrode (250) is positioned below first or primary working electrode (240) within the electrolyte volume, wherein gas inlet 222 is positioned in a top or upper section of gas sensor (210). A reference electrode (270) is positioned parallel to or generally parallel first or primary working electrode (240) below counter electrode (250) with the electrolyte volume.

A secondary working electrode (260) is positioned parallel or generally parallel to first or primary working electrode (140) and adjacent second gas inlet (224) of sensor housing (120).

Primary working electrode (240), counter electrode (250) and reference electrode (270) form a primary sensor system (210*a*). Secondary working electrode (260), counter electrode (250) and reference electrode (270) form secondary sensor system (210*b*). In a first mode of operation, primary working electrode (240) is biased at a potential suitable to catalyze reaction of the target gas, while secondary working electrode (260) is biased at a potential to inhibit or prevent such a reaction. In the first mode, primary working electrode (240), and primary sensor system (210*a*), operate to output a signal to measure a concentration of the target gas, while secondary working electrode (260), and secondary sensor system (210*b*), form a baseline sensor system that assists in determining a baseline of the gas sensor. In a second mode, primary working electrode (240) is biased to a potential to inhibit or prevent reaction of the target gas at the surface thereof, while secondary working electrode is biased to a potential so that target gas is reacted (oxidized/reduced) at the surface thereof. In the second mode, secondary working electrode (260), and secondary sensor system (210*b*), operate to output a signal to measure a concentration of the target gas, while primary working electrode (220), and primary sensor system (210*a*), form a baseline sensor system that assists in determining a baseline of the gas sensor. Gas sensor (210) may, for example, be switched or cycled periodically (with a constant or variable frequency) between the first mode and the second mode. Switching or cycling between the first mode and the second made may increase the life of gas sensor (210) as compared to a gas sensor which is operated continuously in a single mode. Correction factors for each mode of operation may, for example, be determined at the time of manufacture of the sensor.

Because of the difference in biasing in the first mode and the second mode, physical barriers as described above may not be necessary and a single inlet may be used. To take advantage of physical barrier (including distance through electrolyte (230)), first inlet (222) (to which primary working electrode (240) is adjacent) and second inlet (224) (to which secondary working electrode (260) is adjacent) may be provided at opposite ends of gas sensor (210*a*). In the first mode, first gas inlet (222) may be opened, while second gas inlet (224) is closed. Thus, the concentration of the target gas at the surface of secondary working electrode (260) will be minimized. Minimization of the concentration of the target gas at the surface of secondary working electrode (224) may be aided by one or more physical barriers (280). In the second mode, first gas inlet (222) may be closed, while second gas inlet (224) is open. Thus, the concentration of the target gas at the surface of primary working electrode (240) will be minimized. Opening/closing of first gas inlet (222) and second gas inlet (224) may, for example, occur automatically or manually. As described above, primary working electrode (240) and/or secondary working electrode (260) may be periodically cleaned (for example, by applying a pulse of energy thereto or by applying a sweep of energy thereto through a range of potentials) in, for example, a periodic manner.

Example 1

A conventional $NH_3$ sensor typically exhibits a changing baseline upon extended or continuous target/interferant gas exposure. In a number of studies, ammonia sensors were constructed as illustrated in FIG. 1A. To detect the changing baseline, secondary or baseline electrode (60) included an Iridium catalyst. Barrier 80 was formed as a polymer membrane (a PE sheet) and was used as barrier to minimize contact of secondary or baseline working electrode (60) to target/interferant gas that may diffuse through electrolyte (30).

Figure 2A:
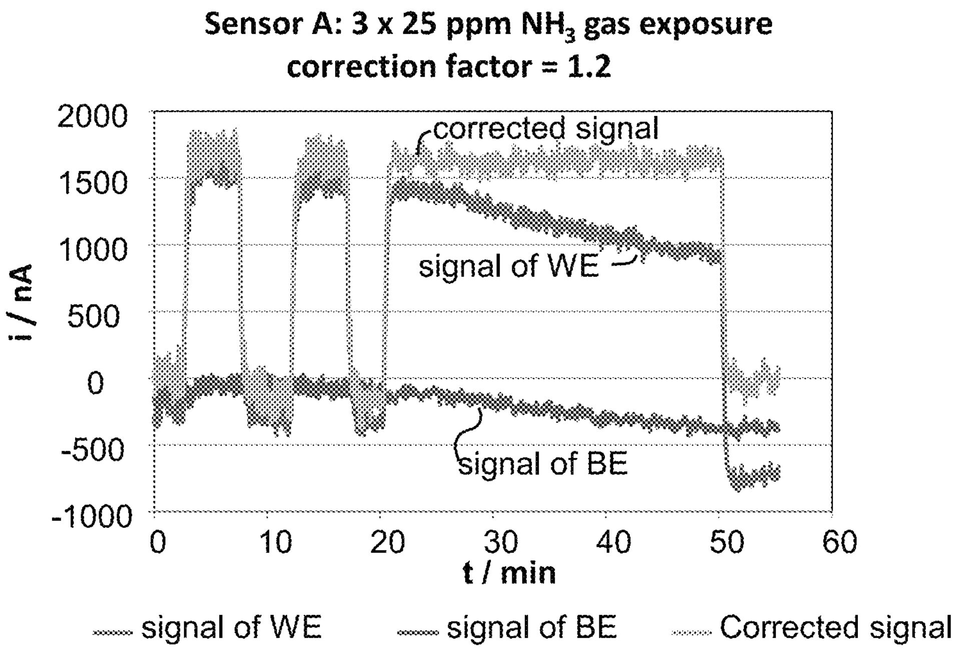
FIG. 2A illustrates the response of a gas sensor of FIG. 1A to a target gas ($NH_3$) before and after applying a correction factor F of 1.2.
Figure 2B:
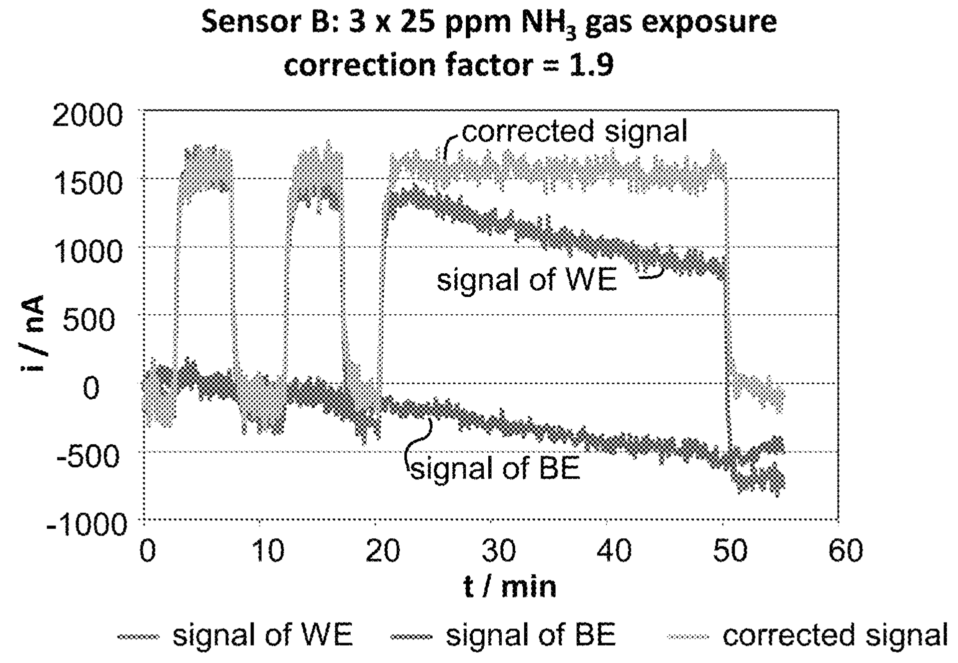
FIG. 2B illustrates the response of another gas sensor of FIG. 1A to a target ($NH_3$) gas before and after applying a correction factor F of 1.9.

Gas sensor (10) was exposed to $NH_3$ gas at a low concentration (25 ppm). The current signal generated was followed over 30 min as illustrated in FIGS. 2A and 2B. The response of primary working electrode (40) is shown a blue line and the response of the secondary or baseline electrode is shown a red line.

The correction factor F was determined as set forth above and a corrected output signal was calculated according to $i_{corrected}$=iWE1−[iWE2*correction factor]. The correction factor was 1.2 in FIG. 2A and was 1.9 in FIG. 2B. After applying the correction factor, the corrected sensor signals are obtained.

The correction factors in FIGS. 2A and 2B were selected such that the corrected sensor output is stable. The differences between the correction factors in the studies of FIGS. 2A and 2B arise from differences and variances of the sensor construction, electrode structure, relative electrode positions, etc. A correction factor may, for example, be determined for an individual sensor or a class of similar sensors at the time of manufacture.

Example 2

In several other studies of a $NH_3$ sensor according to the embodiment of FIG. 1B, all four electrodes were made of iridium. In addition to physical barrier (80), which was a polymer (PE) membrane, a negative bias was applied to secondary or baseline electrode (60) to prevent ammonia oxidation at the surface of that electrode. In a number of studies, a negative bias of −200, −300 and −400 mV was applied to secondary or baseline electrode (60), while there was no bias applied to primary working electrode (40).

Figure 3A:
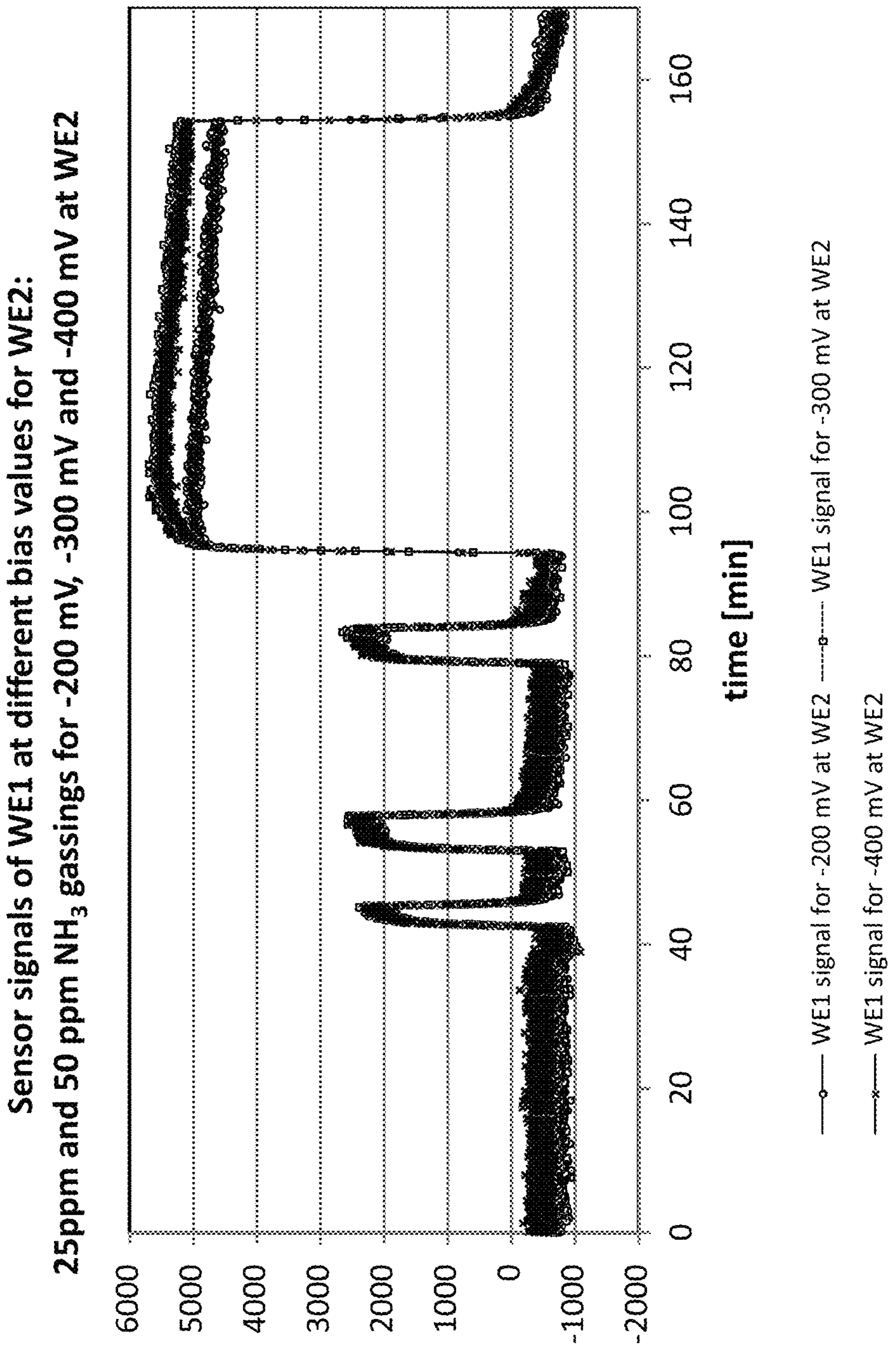
FIG. 3A illustrates a graph of the current signal over time of a primary working electrode of a gas sensor fabricated as illustrated in FIG. 1B in response to the target gas (50 ppm $NH_3$) for biases of −200, −300 and −400 mV applied to a secondary or baseline electrode thereof.
Figure 3B:
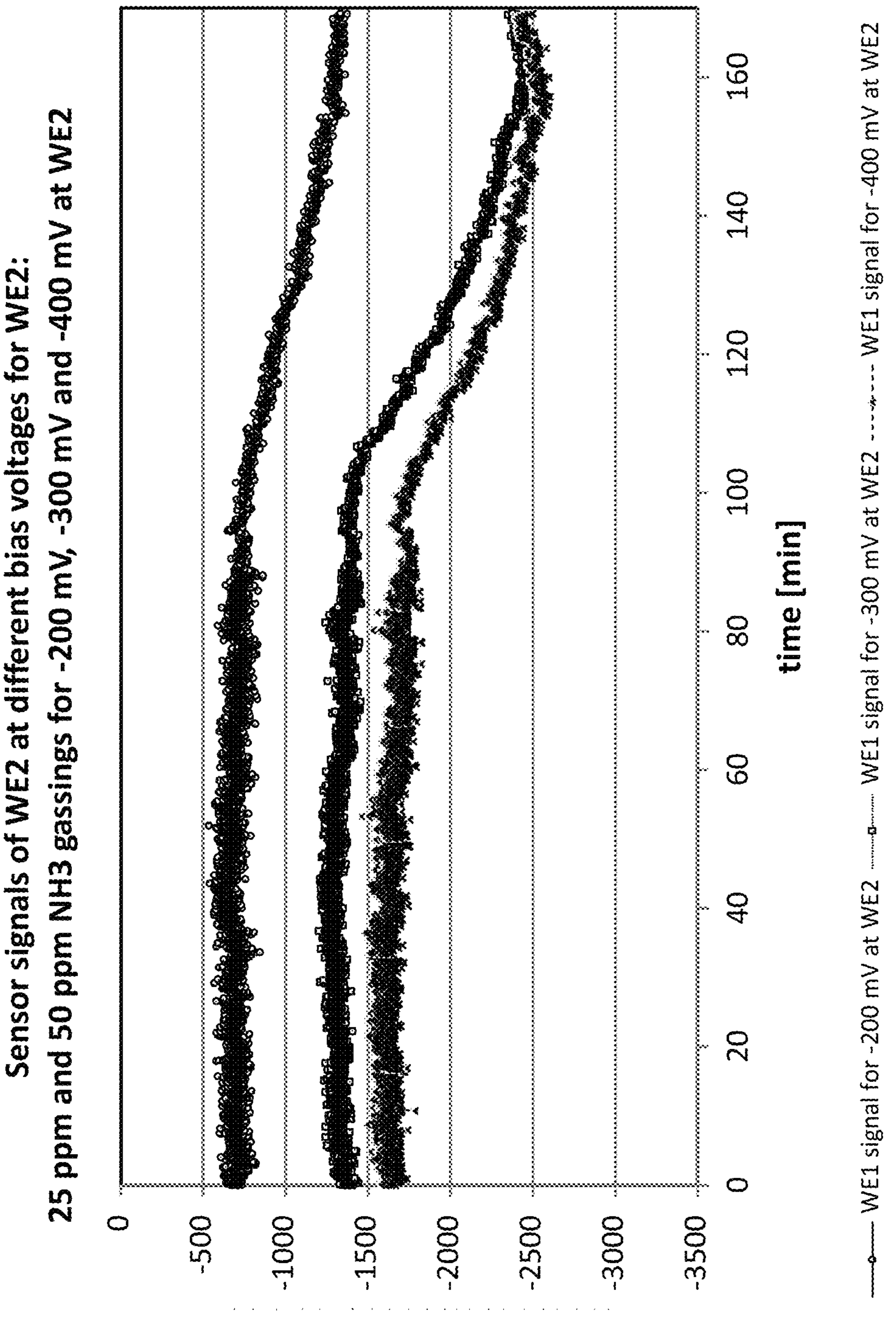
FIG. 3B illustrates the current signal over time of the secondary or baseline electrode of a gas sensor of FIG. 3B in response to the target gas (50 ppm $NH_3$) for biases of −200, −300 and −400 mV applied to a secondary or baseline electrode.

The sensor was exposed to a gas including $NH_3$ at a concentration of 25 ppm for three periods of 5 minutes and at a concentration of 50 ppm for 60 min. The current signals generated are illustrated in FIGS. 3A and 3B. FIG. 3A shows the signal of primary working electrode (40) at different bias values for secondary or baseline electrode (60): −200 mV (black solid line), −300 mV (red dot-dashed line) and −400 mV (blued dashed line).

FIG. 3B shows the signal of secondary or baseline electrode (60) at different bias values for secondary or baseline electrode (60): −200 mV (black solid line), −300 mV (red dot-dashed line) and −400 mV (blued dashed line).

Figure 3C:
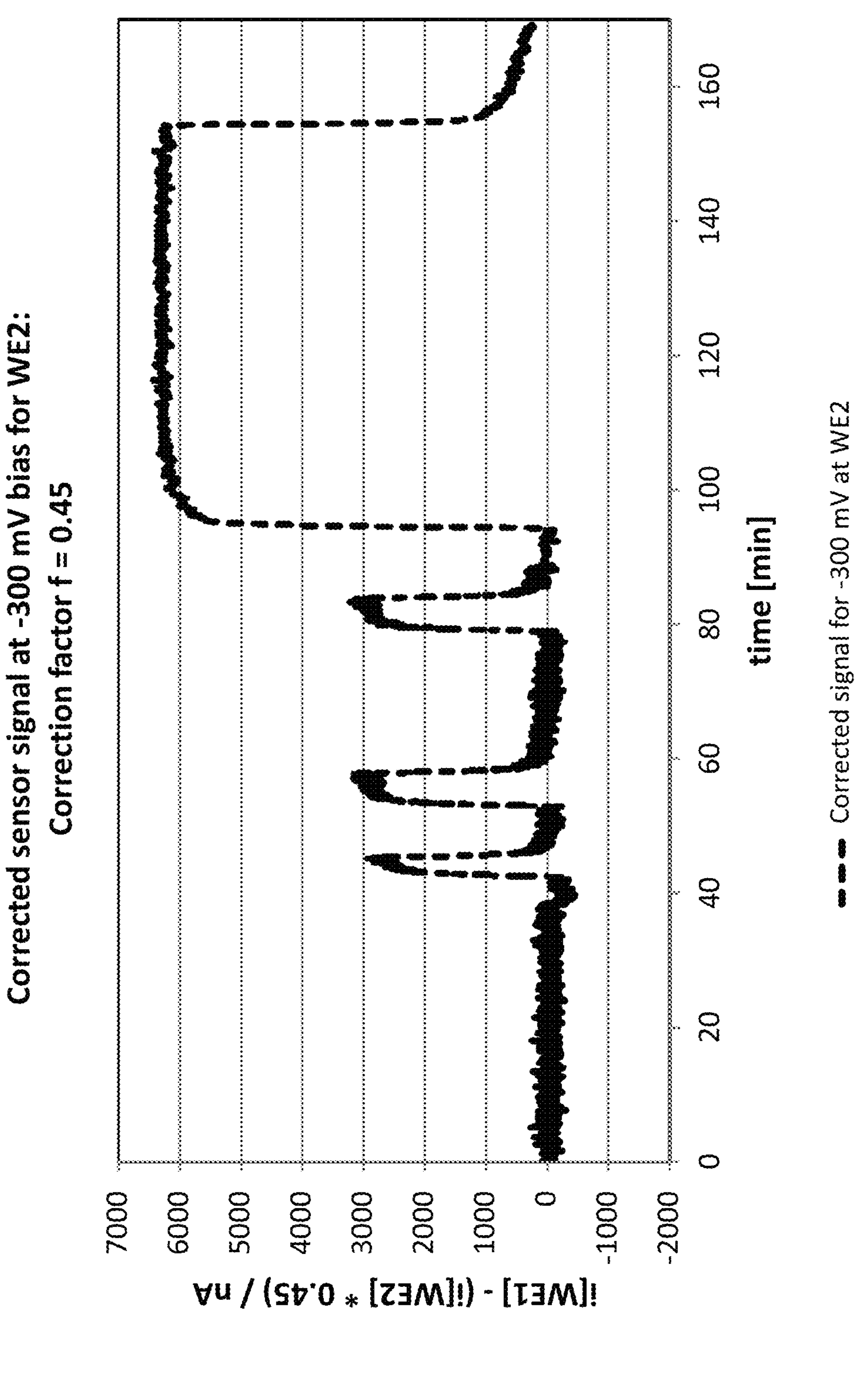
FIG. 3C illustrates a corrected signal over time of the primary working electrode of a gas sensor of FIG. 3B in response to the target gas (50 ppm $NH_3$) while a bias of −300 is applied to the secondary or biasing electrode.

The corrected signal of primary working electrode (40) for a −300 mV bias of secondary or baseline electrode (60) is shown in FIG. 3C. A correction factor F of 0.45 was applied according to the equation $i_{corrected}=i_{WE1}-(i_{WE2}*0.45)$.

The correction factor was determined individually for every bias potential and for each sensor such that the corrected output was as stable as possible. Once again, the correction factor F is dependent on a number of factors including the sensor construction and the type of protection of the secondary electrode. As described above, FIG. 3A shows the signal for primary working electrode (40), while FIG. 3B shows the signal for secondary or baseline electrode (60). Both signals are combined (via the determined correction factor) in the corrected signal of FIG. 3C.

Example 3

Figure 4A:
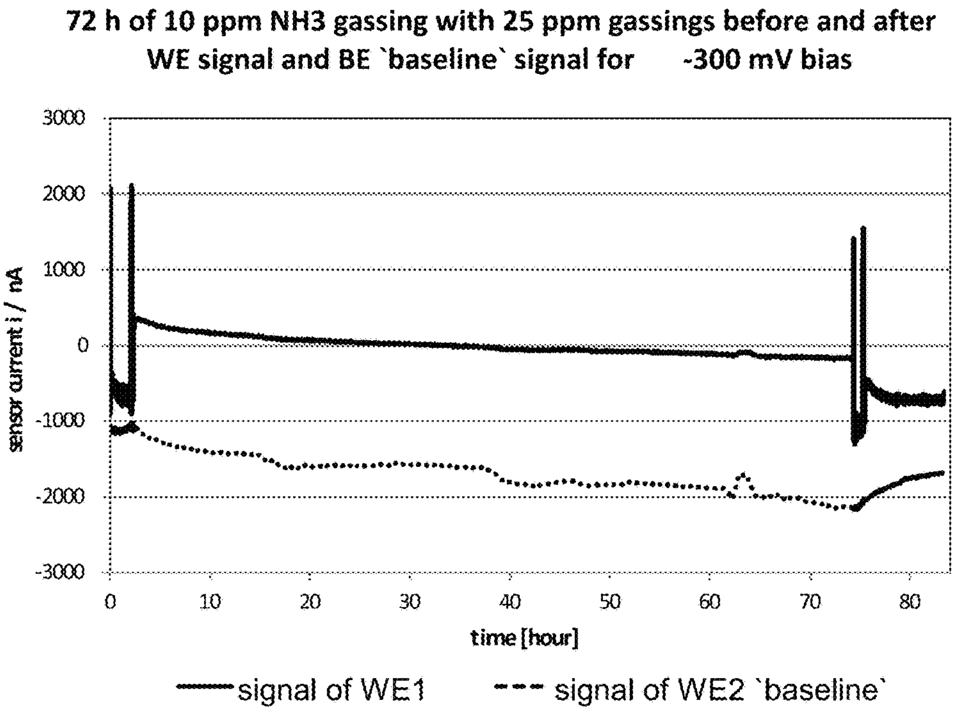
FIG. 4A illustrates a current signal over time of the primary working electrode and a secondary or baseline electrode of a gas sensor fabricated as illustrated in FIG. 1B in response to application of the target gas (10 ppm $NH_3$) for 72 h while a bias of −300 mV is applied to the secondary or baseline electrode.

FIG. 4A shows a signal for primary working electrode (140) and the signal for secondary or baseline electrode after a long-term exposure of sensor (110) of FIG. 1B. All electrodes included an Iridium electrocatalyst. In the studies of FIG. 4A, gas sensor (110) was exposed to 10 ppm $NH_3$ for 72 h and a 25 ppm $NH_3$ calibration was performed before and after the long-term exposure. A bias of −300 mV was applied to secondary or baseline electrode (160).

Figure 4B:
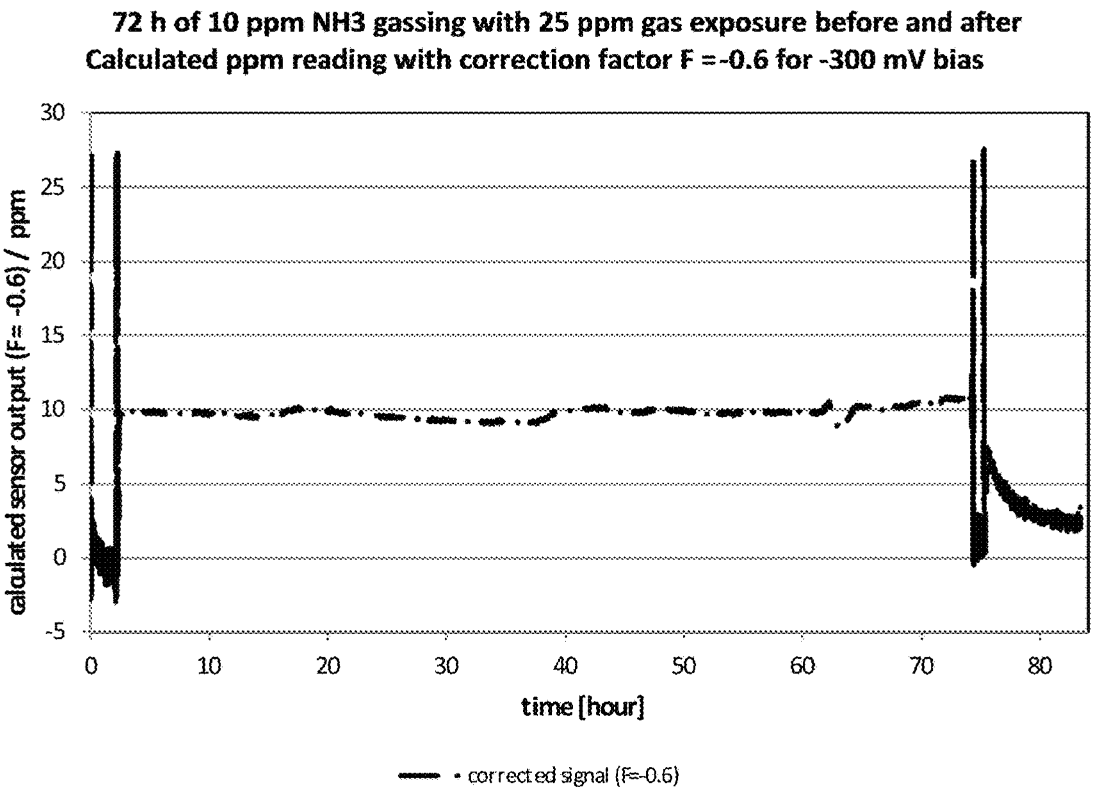
FIG. 4B illustrates a corrected signal over time of the primary working electrode of a gas sensor of FIG. 4A in response to application of the target gas (10 ppm $NH_3$) for 72 h while a bias of −300 is applied to the secondary or baseline electrode.

FIG. 4B shows the corrected signal for the study of FIG. 4A. The correction factor F was determined to be −0.6. An output in parts per million or ppm was calculated from the corrected current signal with a 25 ppm $NH_3$ calibration. The 10 ppm signal was stable over the entire 72 hour period of long-term gas exposure. Also, the 25 ppm $NH_3$ readings are stable after the long-term gas exposure.

In a number of embodiments of $NH_3$ sensors hereof, a negative bias or voltage in a range of −100 and −600 mV, or between −200 and −400 mV, is applied to the secondary or baseline electrode, while no bias or voltage or a positive bias/or voltage in the range of 10 and 100 mV, or 50 and 100 mV, is applied to the primary working electrode. The correction factor F may, for example, be in a range between −10 and +10, between −6 and +6, or between −3 and +3 in such sensors. Studies hereof have demonstrated that a stable (corrected) signal may be output for at least 20 min, at least 60 min, at least 120 min and even longer during long-term target gas exposure. The gas concentration of the target gas during such long-term exposure may, for example, be at least 5 ppm, at least 25 ppm, or at least 50 ppm.

Example 4

Figure 5A:
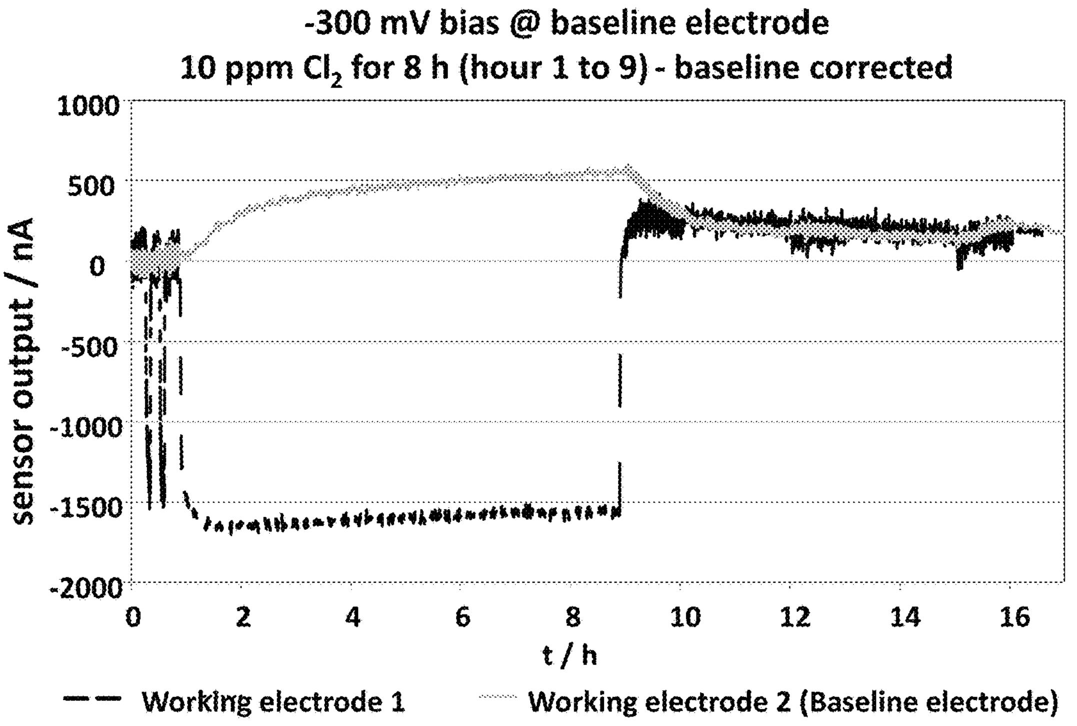
FIG. 5A illustrates a current signal over time of the primary working electrode and a secondary or baseline electrode of a gas sensor fabricated as illustrated in FIG. 1B in response to application of the target gas (10 ppm $Cl_2$) for 8 h while a bias of −300 mV is applied to the secondary or baseline electrode.

In a number of studies, correction of instable signals during the detection of chlorine in an iridium electrode system and an ethylammonium nitrate electrolyte were demonstrated. In that regard, representative sensors were fabricated as illustrated schematically in FIG. 1B. All electrodes included an iridium electrocatalyst, and the sensor was filled with an ethylammonium nitrate electrolyte. In a number of studies, such sensors were exposed to 10 ppm of chlorine gas. A bias of −300 mV was applied to the secondary or baseline electrode (160). The primary working electrode (140) was not biased (0 mv). The sensor was exposed to 10 ppm $Cl_2$ for 8 hours. FIG. 5A illustrates the uncorrected signal of the primary working electrode (black dotted line) and the baseline electrode (grey solid line).

As illustrated in FIG. 5A, the sensor signal is increasing over the 8 hours of exposure to $Cl_2$ with an approximately constant slope of about 5.4 nA/h. The baseline electrode signal is increasing during the exposure to $Cl_2$ with a slope of about 15.3 nA/h (calculated from $t_1$=6 h to $t_2$=8.87 h). From these slopes, a correction factor f can be calculated as follows:

$$f=\text{slope } WE/\text{slope } BE=0.35$$

The corrected sensor signal is then derived via a baseline corrected signal as follows:

$$\text{signal}_{(corrected)}=\text{signal}_{WE}-(\text{signal}_{BE}*f)$$

Figure 5B:
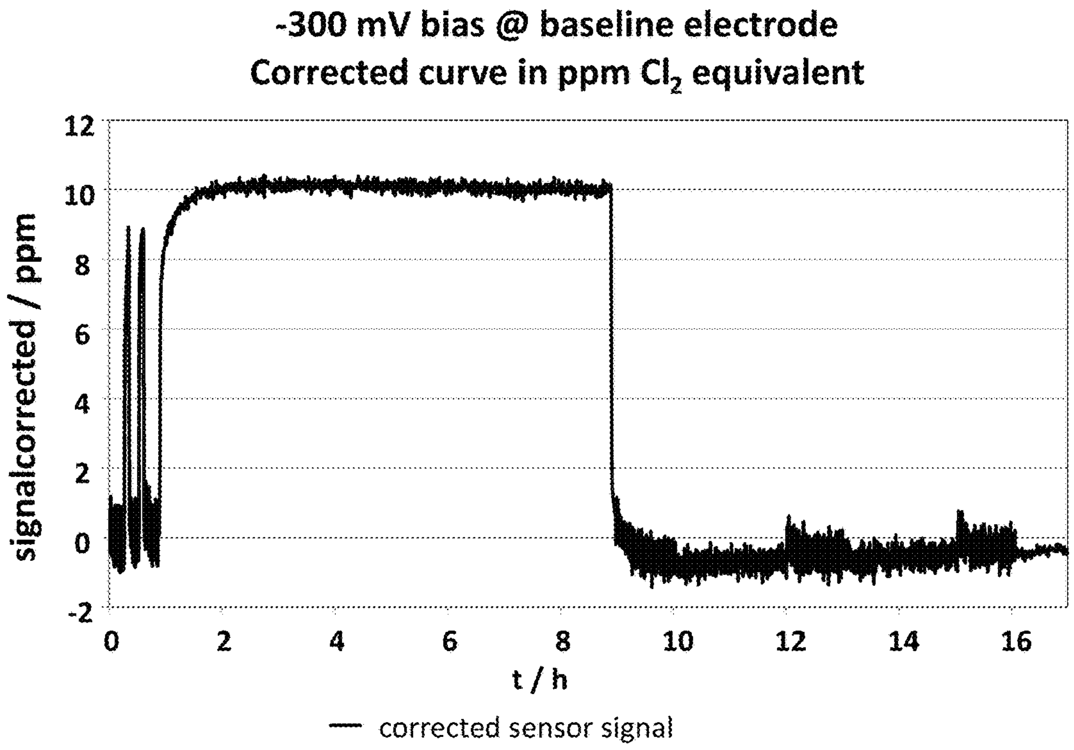
FIG. 5B illustrates a corrected signal over time of the primary working electrode of a gas sensor of FIG. 5A in response to application of the target gas (10 ppm $Cl_2$) for 8 h while a bias of −300 is applied to the secondary or baseline electrode.

FIG. 5B illustrates the value of $\text{signal}_{(corrected)}$ for sensor upon exposure to 10 ppm $Cl_2$. The values of FIG. 5B are calculated to ppm $Cl_2$ equivalent.

The curve of FIG. 5B demonstrates a relatively constant corrected output signal over the period of gas exposure. The correction factor may vary from sensor to sensor. For example, for another sensor, a correction factor of 0.92 was determined. The methodology also works for other bias values at both electrodes (for example, 0 mV/−400 mV; +50 mV/−450 mV).

Example 5

Correction of instable signals during the detection of sulfur dioxide with a gold/platinum electrode system and a sulfuric acid electrolyte was also demonstrated. The sulfur dioxide sensors were fabricated as illustrated schematically in FIG. 1B. Primary working electrode (140), baseline electrode (160) and common reference electrode (170) included a gold electrocatalyst. Common counter electrode (150) included a platinum electrocatalyst. A bias of −200 mV was applied to baseline electrode (160), while primary working electrode (140) was not biased.

Figure 6A:
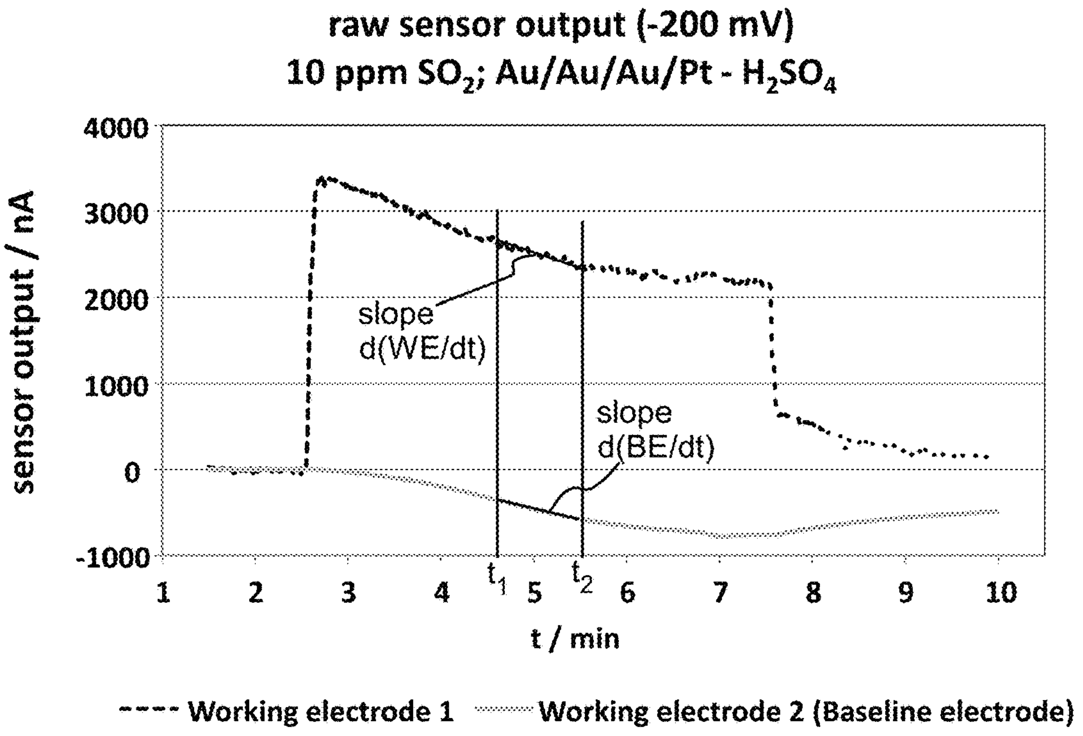
FIG. 6A illustrates a current signal over time of the primary working electrode and a secondary or baseline electrode of a gas sensor fabricated as illustrated in FIG. 1B in response to application of the target gas (10 ppm $SO_2$) for 5 min while a bias of −200 mV is applied to the secondary or baseline electrode.

The sulfur dioxide sensors were filled with diluted sulfuric acid as the electrolyte. An aqueous sulfuric acid electrolyte tends to dry out in dry conditions, which affects the sensor signal behavior. To mimic this behavior, representative sulfur dioxide sensors were stored at 70° C. for 4 days. After this drying period, the sensors were exposed to 10 ppm $SO_2$ gas for 5 minutes. FIG. 6A illustrates an example of sensor raw signal of primary working electrode WE (140) and baseline electrode BE (160) for one representative sensor.

As illustrates in FIG. 6A, the sensor or primary working electrode signal decrease over the 5 minute period of gas exposure with an approximately constant slope of about 249 nA/min. The baseline electrode signal decreased with a slope of about 162 nA/min (calculated from $t_1$=2.9 min to $t_2$=7.5 min). From these data, a correction factor f can be calculated as follows:

$$f=\text{slope } WE/\text{slope } BE=1.54$$

A corrected sensor signal is then derived via a baseline corrected signal as follows:

$$signal_{(corrected)} = signal_{WE} - (signal_{BE} * f)$$

Figure 6B:
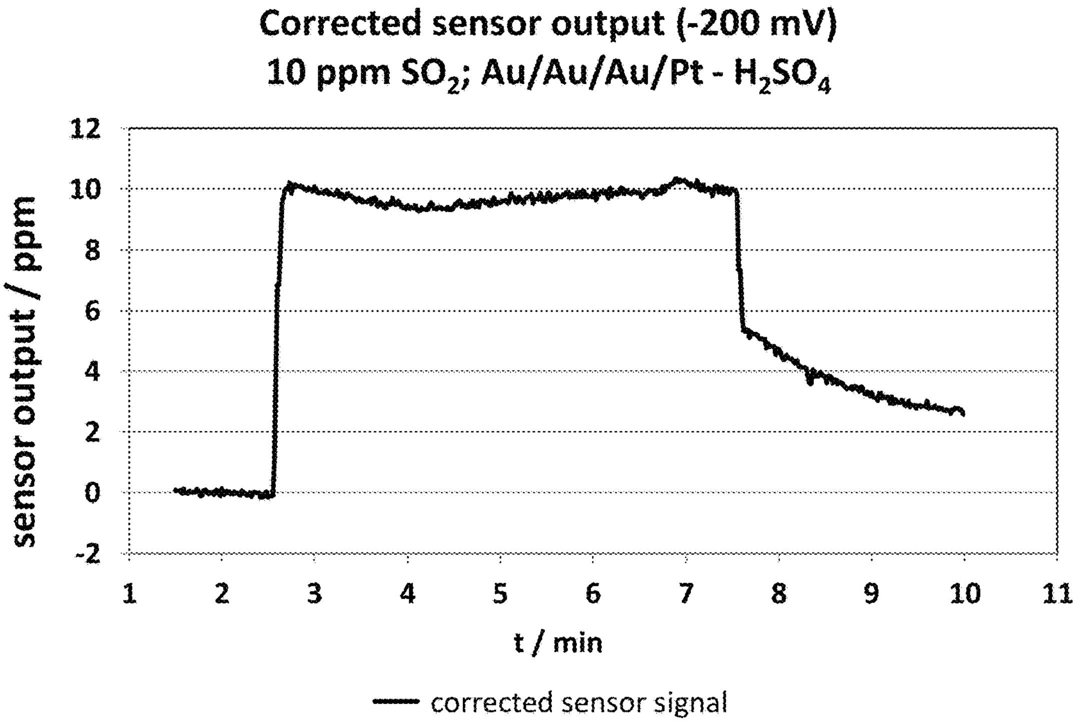
FIG. 6B illustrates a corrected signal over time of the primary working electrode of a gas sensor of FIG. 6A in response to application of the target gas (10 ppm $SO_2$) for 5 min while a bias of −200 is applied to the secondary or baseline electrode.

FIG. 6B illustrates the value of $signal_{(corrected)}$ for exposure of the sensor to 10 ppm $SO_2$ over a period of 5 minutes. The values in FIG. 6B are calculated to ppm $SO_2$ equivalent.

The determined correction factors for several different sulfur dioxide sensors are set forth Table 1 below. All the values in Table 1 were determined using the method described above (sensor A in Table 1). All of the sulfur dioxide sensors demonstrated comparable or similar behavior.

TABLE 1

| Sensor | Correction Factor F |
|---|---|
| A | 1.54 |
| B | 1.67 |
| C | 1.61 |
| D | 1.71 |
| E | 1.17 |

The experimental studies hereof demonstrate that the devices, systems and methods hereof have a broad range of possible applications. For example, the devices, systems and methods hereof may be used in connection with a broad range of analyte or target gases. Further, the reaction times can be within minutes, hours or days. Many different electrode materials and electrolytes may be used in sensors hereof for detection of many different analyte or target gasses. Moreover, the devices, systems and methods hereof are useful for different disturbing influences such as long-term exposure to a gas (see, for example, the studies with $NH_3$) and dry conditions (see, for example, the studies with $SO_2$).

In general, it is desirable to determine the correction factor by comparing the WE and BE signals for one or more determined periods of time over the available period of gas exposure to optimize the corrected signal to be as stable/constant as possible. As described above, the formula for the correction factor may be written mathematically as a comparison of 1st derivatives over time as follows: $F=[d(WE)/dt]/[d(BE)/dt]$ or $\Delta WE/\Delta BE$. In a number of embodiments, the delta value were determined by, for example, calculating a linear regression of the slope of each response curve over a certain range of times or data points. As, for example, illustrated in FIG. 6A a slope (dWE/dt) of the output curve of the working electrode was determined over a time period $t_1$-$t_2$ during exposure to the target gas ($SO_2$). Likewise, a slope (dBE/dt) of the output curve of the baseline electrode was determined over time period $t_1$-$t_2$. A correction factor was then determined as described above. As clear to one skilled in the art, the slope of a response curve at a particularly point of over a range of time/points may be calculated in other manners. Moreover, the slope may be calculated over different ranges of time/data points and an average or mean may be used. During the early time of exposure to the target gas, there is substantial variance or noise in the output. At later times during exposure to the target gas, however, the slopes of the output response curves (that is, d(WE)/dt and d(BE)/dt) have a generally constant ratio. In a number of embodiments, the slopes are determined after a threshold time (for example, after 2 minutes, 3 minutes, 5 minutes or 10 minutes). In general, the ratio of the slopes becomes more constant over time. A reasonable threshold time to begin determination of the slopes can be readily determined for a particular target gas.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. An electrochemical gas sensor for determining a concentration of a target gas in an environment, comprising:

a housing comprising at least one gas inlet;

an electrolyte within the housing;

at least one working electrode in ionic contact with the electrolyte, wherein an output of the at least one working electrode varies over time during exposure of the at least one working electrode to the target gas at a constant concentration as a result of exposure to the target gas;

at least one counter electrode in ionic contact with the electrolyte;

at least one secondary electrode in ionic contact with the electrolyte, the at least one secondary electrode being configured so that less of the target gas entering the housing via the at least one gas inlet reacts at the at least one secondary electrode than at the at least one working electrode; and electronic circuitry in operative connection with the at least one working electrode, the at least one counter electrode and the at least one secondary electrode, the electronic circuitry comprising a processor system and a memory system in operative connection with the processor system, the electronic circuitry being configured to receive the output from the at least one working electrode and to receive an output from the at least one secondary electrode, the electronic circuitry further comprising an algorithm stored in the memory system and comprising a predetermined correction factor f as a parameter in the algorithm, wherein the predetermined correction factor f is stored in the memory system at the time of manufacture, the electronic circuitry further being configured to determine the concentration of the target gas in the environment in a measurement mode, subsequent to the time of manufacture, via execution of the algorithm by the processor system, wherein the algorithm comprises the formula:

$$signal(corrected) = signal\,WE - (signal\,BE * f)$$

wherein signalWE is the output signal of the at least one working electrode in the measurement mode and signalBE is the output signal of the at least one secondary electrode in the measurement mode, and signal(corrected) is an output which is corrected for drift resulting from extended exposure to the target gas subsequent to the time of manufacture, wherein the correction factor f is predetermined and stored in the memory system at the time of manufacture from (i) a ratio of a slope of the output signal of the at least one working electrode to a different slope of the output signal of the at least one secondary electrode during exposure of the electrochemical gas sensor to a test gas including the target gas in a known concentration over a predetermined period of time during an assessment of the electrochemical sensor or (ii) a ratio of a slope of an output signal of at least one working electrode of a second electrochemical gas sensor to a different slope of an output signal of at least one secondary electrode of the second electrochemical gas sensor during exposure of the second electrochemical gas sensor to the test gas including the target gas in the known concentration over the predetermined period of time during an assessment of the second electrochemical sensor, wherein the predetermined correction factor f is not equal to 1.

2. The electrochemical gas sensor of claim 1 further comprising at least one reference electrode in ionic contact with the electrolyte, the electronic circuitry being in operative connection with the at least one reference electrode.

3. The electrochemical gas sensor of claim 1 wherein the at least one secondary electrode is positioned within the housing such that at least one physical barrier through which the target gas cannot be transported is positioned between the at least one working electrode and the at least one secondary electrode.

4. The electrochemical gas sensor of claim 3 wherein the at least one physical barrier comprises a coating covering a portion of a surface of the at least one secondary electrode or a component spaced from the at least one secondary electrode.

5. The electrochemical gas sensor of claim 1 wherein the at least one secondary electrode is substantially catalytically inactive with the target gas during operation in at least one of the measurement mode and the assessment of the sensor.

6. The electrochemical gas sensor of claim 1 wherein the at least one secondary electrode is maintained at a potential via the electronic circuitry at which the at least one secondary electrode is substantially catalytically inactive with the target gas.

7. The electrochemical gas sensor of claim 1 wherein the at least one secondary electrode comprises an electrically conductive species which is substantially catalytically inactive with the target gas.

8. The electrochemical gas sensor of claim 1 wherein the target gas is $NH_3$.

9. The electrochemical gas sensor of claim 1 wherein the at least one secondary electrode comprises a conductive species on a surface thereof.

10. The electrochemical gas sensor of claim 1 wherein each of the at least one working electrode and the at least one secondary electrode comprise a same electrocatalytic species on a surface thereof.

11. The electrochemical gas sensor of claim 1 wherein the output of the at least one working electrode is determined from current flow between the at least one working electrode and the at least one counter electrode and the output of the at least one secondary electrode is determined from current flow between the at least one secondary electrode and the at least one counter electrode.

12. A method of stabilizing a gas concentration output signal of an electrochemical gas sensor for detecting a target gas in an environment, the electrochemical gas sensor including a housing comprising at least one gas inlet, an electrolyte within the housing, at least one working electrode in ionic contact with the electrolyte, wherein an output of the at least one working electrode varies over time during exposure of the at least one working electrode to the target gas at a constant concentration of the target gas as a result of exposure to the target gas, at least one counter electrode in ionic contact with the electrolyte, at least one secondary electrode in ionic contact with the electrolyte, the at least one secondary electrode being configured so that less of the target gas entering the housing via the at least one gas inlet reacts at the at least one secondary electrode than at the at least one working electrode, and electronic circuitry comprising a processor system and a memory system in operative connection with the processor system in operative connection with the at least one working electrode, the at least one counter electrode and the at least one secondary electrode, the method comprising:

determining a correction factor f at the time of manufacture of the electrochemical gas sensor from (i) a ratio of a slope of the output signal of the at least one working electrode to a different slope of an output signal of the at least one secondary electrode during exposure of the electrochemical gas sensor to a test gas including the target gas in a known concentration over a predetermined period of time during an assessment of the electrochemical or (ii) a ratio of a slope of an output signal of at least one working electrode of a second electrochemical gas sensor to a different slope of an output signal of at least one secondary electrode of the second electrochemical gas sensor during exposure of the second electrochemical gas sensor to the test gas including the target gas in the known concentration over the predetermined period of time during an assessment of the second electrochemical sensor, wherein the predetermined correction factor f is not equal to 1, storing the correction factor in the memory system, and determining the concentration of the target gas in the environment via the electronic circuitry in a measurement mode, subsequent to the time of manufacture, via execution of an algorithm stored in the memory system by the processor system, wherein the algorithm comprises the formula:

$$\text{signal(corrected)}=\text{signal}WE-(\text{signal}BE*f)$$

wherein signalWE is the output signal of the at least one working electrode in the measurement mode and signalBE is the output signal of the at least one secondary electrode in the measurement mode, and signal(corrected) is an output which is corrected for drift resulting from extended exposure to the target gas subsequent to the time of manufacture.

13. The method of claim 12 wherein the electrochemical gas sensor further comprises at least one reference electrode in ionic contact with the electrolyte, the electronic circuitry being in operative connection with the at least one reference electrode.

14. The method of claim 13 further comprising positioning the at least one secondary electrode a predetermined distance from the at least one gas inlet, the predetermined distance being greater than a distance of the at least one working electrode from the at least one gas inlet.

15. The method of claim 13 further comprising positioning the at least one secondary electrode within the housing such that at least one physical barrier through which the target gas cannot be transported is positioned between the at least one working electrode and the at least one secondary electrode.

16. The method of claim 15 wherein the at least one physical barrier comprises a coating covering a portion of a surface of the at least one secondary electrode or a component spaced from the at least one secondary electrode.

17. The method of claim 13 further comprising maintaining the at least one secondary electrode at a potential via the electronic circuitry at which reaction of the target gas at the at least one secondary electrode is inhibited.

18. The method of claim 12 wherein the target gas is $NH_3$.

19. The method of claim 12 wherein the at least one secondary electrode is substantially catalytically inactive with the target gas during operation in at least one of the measurement mode and the assessment of the sensor.

20. The method of claim 12 wherein the at least one secondary electrode is maintained at a potential via the electronic circuitry at which the at least one secondary electrode is substantially catalytically inactive with the target gas.

21. The method of claim 12 wherein the at least one secondary electrode comprises an electrically conductive species which is substantially catalytically inactive with the target gas.

22. The method of claim 12 wherein the output of the at least one working electrode is determined from current flow between the at least one working electrode and the at least one counter electrode and the output of the at least one secondary electrode is determined from current flow between the at least one secondary electrode and the at least one counter electrode.

23. The method of claim 12 wherein the target gas is $NH_3$ and wherein a negative bias or a voltage in a range between 100 and 600 mV is applied to the at least one secondary electrode, while no bias or voltage or a positive bias or voltage in a range between 10 and 100 mV is applied to the at least one working electrode.

24. The method of claim 23 wherein the negative bias or voltage applied to the at least one secondary electrode is between −200 and −400 mV.

25. The method of claim 23 wherein the positive bias or voltage applied to the at least one working electrode is between 50 and 100 mV.

26. The method of claim 12 further comprising storing the correction factor f in the memory system of the second electrochemical gas sensor for detecting the target gas in the environment.

* * * * *

UNITED STATES PATENT AND TRADEMARK OFFICE

CERTIFICATE OF CORRECTION

PATENT NO. : 11,231,387 B2
APPLICATION NO. : 15/879138
DATED : January 25, 2022
INVENTOR(S) : Sebastian Ross, Kathrin Tölle and Brian Keith Davis It is certified that error appears in the above-identified patent and that said Letters Patent is hereby corrected as shown below:

In the Specification
Column 2, Line 65 delete "$B_2H^6$" and insert --$B_2H_6$--.
Column 3, Line 51 delete "correction" and insert --correction factor--.
Column 4, Line 52 delete "FIG. 3B" and insert --FIG. 1B--.
Column 15, Line 20 delete "$B_2H^6$" and insert --$B_2H_6$--.
Column 17, Line 45 delete "(60)" and insert --(40)--.
Column 19, Line 50 delete "electrode" and insert --electrode (260)--.
Column 19, Line 55 delete "(220)" and insert --(240)--.
Column 20, Line 6 delete "(210a)" and insert --(210)--.
Column 20, Line 11 delete "(224)" and insert --(260)--.
Column 20, Line 63 delete "(80)" and insert --(180)--.
Column 20, Line 65 delete "(60)" and insert --(160)--.
Column 21, Line 1 delete "(60)" and insert --(160)--.
Column 21, Line 2 delete "(40)" and insert --(140)--.

Signed and Sealed this
Twenty-sixth Day of April, 2022

Katherine Kelly Vidal

Katherine Kelly Vidal
*Director of the United States Patent and Trademark Office*